United States Patent
Zhong et al.

(10) Patent No.: US 11,669,231 B2
(45) Date of Patent: *Jun. 6, 2023

(54) ELECTRONIC MAIL CONTROL SYSTEM INTEGRATING TIMESLOT FUNCTIONALITY

(71) Applicant: Microsoft Technology Licensing, LLC, Redmond, WA (US)

(72) Inventors: Lin Zhong, Bellevue, WA (US); Shahil Soni, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/104,477

(22) Filed: Nov. 25, 2020

(65) Prior Publication Data

US 2021/0081098 A1    Mar. 18, 2021

Related U.S. Application Data

(63) Continuation of application No. 15/151,103, filed on May 10, 2016, now Pat. No. 10,990,254.

(51) Int. Cl.
*G06Q 10/109* (2023.01)
*G06Q 10/107* (2023.01)
(Continued)

(52) U.S. Cl.
CPC ........ *G06F 3/04842* (2013.01); *G06F 3/0482* (2013.01); *G06Q 10/00* (2013.01);
(Continued)

(58) Field of Classification Search
CPC ... G06F 3/04842; G06F 3/0482; G06Q 10/00; G06Q 10/107; G06Q 10/109; G06Q 10/1093; G06Q 10/1095; H04L 51/04
See application file for complete search history.

(56) References Cited

U.S. PATENT DOCUMENTS 8,073,725 B2 * 12/2011 Loring ............... G06Q 10/1093
                                                  705/7.18
10,298,530 B2 * 5/2019 Razavian ........... G06Q 10/1095
(Continued)

FOREIGN PATENT DOCUMENTS

| CN | 102622686 A | 8/2012 |
| CN | 102752074 A | 10/2012 |
| WO | 2016073806 A1 | 5/2016 |

OTHER PUBLICATIONS

"Office Action Issued in European Patent Application No. 17722314.6", dated Aug. 24, 2020, 8 Pages.
(Continued)

*Primary Examiner* — Jennifer N Welch
*Assistant Examiner* — Amy P Hoang
(74) *Attorney, Agent, or Firm* — Christopher J. Volkmann; Kelly, Holt & Christenson, PLLC

(57) ABSTRACT

An electronic mail (email) system generates an email user interface display, with a timeslot actuator, for composing an email message. Actuation of the timeslot actuator is detected and the email system accesses available timeslots from a calendar system corresponding to the user. User selectable display elements, corresponding to each available timeslot, are displayed on the email user interface display, along with message content. When a user selectable display element corresponding to an available timeslot is selected, the email message content is populated with a selectable timeslot element, corresponding to the available timeslot, that can be sent to recipients in the email message.

15 Claims, 17 Drawing Sheets

(51) Int. Cl.
  *G06F 3/04842* (2022.01)
  *G06Q 10/1093* (2023.01)
  *G06Q 10/00* (2023.01)
  *G06F 3/0482* (2013.01)
  *H04L 51/04* (2022.01)

(52) U.S. Cl.
  CPC ......... *G06Q 10/107* (2013.01); *G06Q 10/109* (2013.01); *G06Q 10/1093* (2013.01); *G06Q 10/1095* (2013.01); *H04L 51/04* (2013.01)

(56) References Cited

U.S. PATENT DOCUMENTS

| | | | |
|---|---|---|---|
| 2006/0184944 A1 | 8/2006 | Schwerk | |
| 2007/0234227 A1* | 10/2007 | Prinsen | G06F 3/0486 715/810 |
| 2008/0034047 A1 | 2/2008 | Rosenberg et al. | |
| 2014/0288990 A1* | 9/2014 | Moore | G06Q 10/107 705/7.19 |
| 2014/0372162 A1 | 12/2014 | Dhara et al. | |
| 2016/0350719 A1* | 12/2016 | Wang | H04L 51/10 |

OTHER PUBLICATIONS

"Summons to Attend Oral Proceedings Issued in European Patent Application No. 17735330.7", Mailed Date: Nov. 18, 2020, 10 Pages.
"Summons to Attend Oral Proceedings Issued in European Patent Application No. 17722314.6", Mailed Date: Nov. 12, 2021, 11 Pages.
"Office Action Issued in Chinese Patent Application No. 201780028930.X", dated Jun. 29, 2021, 12 Pages.
"Office Action Issued in Indian Patent Application No. 201847040135", dated Jun. 24, 2021, 6 Pages.
"Second Office Action Issued in Chinese Patent Application No. 201780028930.X", dated Dec. 31, 2021, 20 Pages.
U.S. Appl. No. 15/151,103, filed May 10, 2016.
U.S. Appl. No. 15/198,170, filed Jun. 30, 2016.
"Office Action Issued in Chinese Patent Application No. 201780028930.X", dated Jun. 6, 2022, 30 Pages.
"Office Action and Search Report issued in Chinese Patent Application No. 201780041106.8", dated Dec. 2, 2022, 18 Pages.
"Notice of Allowance Issued in Chinese Patent Application No. 201780028930.X", dated Oct. 10, 2022, 4 Pages.

* cited by examiner

ELECTRONIC MAIL CONTROL SYSTEM INTEGRATING TIMESLOT FUNCTIONALITY

CROSS-REFERENCE TO RELATED APPLICATION

The present application is a continuation of and claims priority of U.S. patent application Ser. No. 15/151,103, filed May 10, 2016, the content of which is hereby incorporated by reference in its entirety.

BACKGROUND

Computing systems are currently in wide use. Some such computing systems include electronic mail systems. Others include calendar or scheduling systems as well.

Users of such systems often communicate using electronic mail systems, and set up meetings with one another, or schedule telephone calls, etc., using the calendar or scheduling system. In addition, it is not uncommon for a user to be precluded from accessing the schedules of other users. Therefore, in order to schedule meetings with one another, users often use electronic mail messages to suggest possible meeting dates and times, and then use the separate calendar or scheduling system in order to generate a scheduling event, such as a meeting invite.

Some current systems also provide a feature within an electronic mail system that can be actuated by the user to schedule a meeting. When the user actuates that feature, the electronic mail system navigates the user to a separate scheduling user interface where the user can select available times that are then shared with other users through the electronic mail system.

The discussion above is merely provided for general background information and is not intended to be used as an aid in determining the scope of the claimed subject matter.

SUMMARY

An electronic mail (email) system generates an email user interface display, with a timeslot actuator, for composing an email message. Actuation of the timeslot actuator is detected and the email system accesses available timeslots from a calendar system corresponding to the user. User selectable display elements, corresponding to each available timeslot, are displayed on the email user interface display, along with message content. When a user selectable display element corresponding to an available timeslot is selected, the email message content is populated with a selectable timeslot element, corresponding to the available timeslot, that can be sent to recipients in the email message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
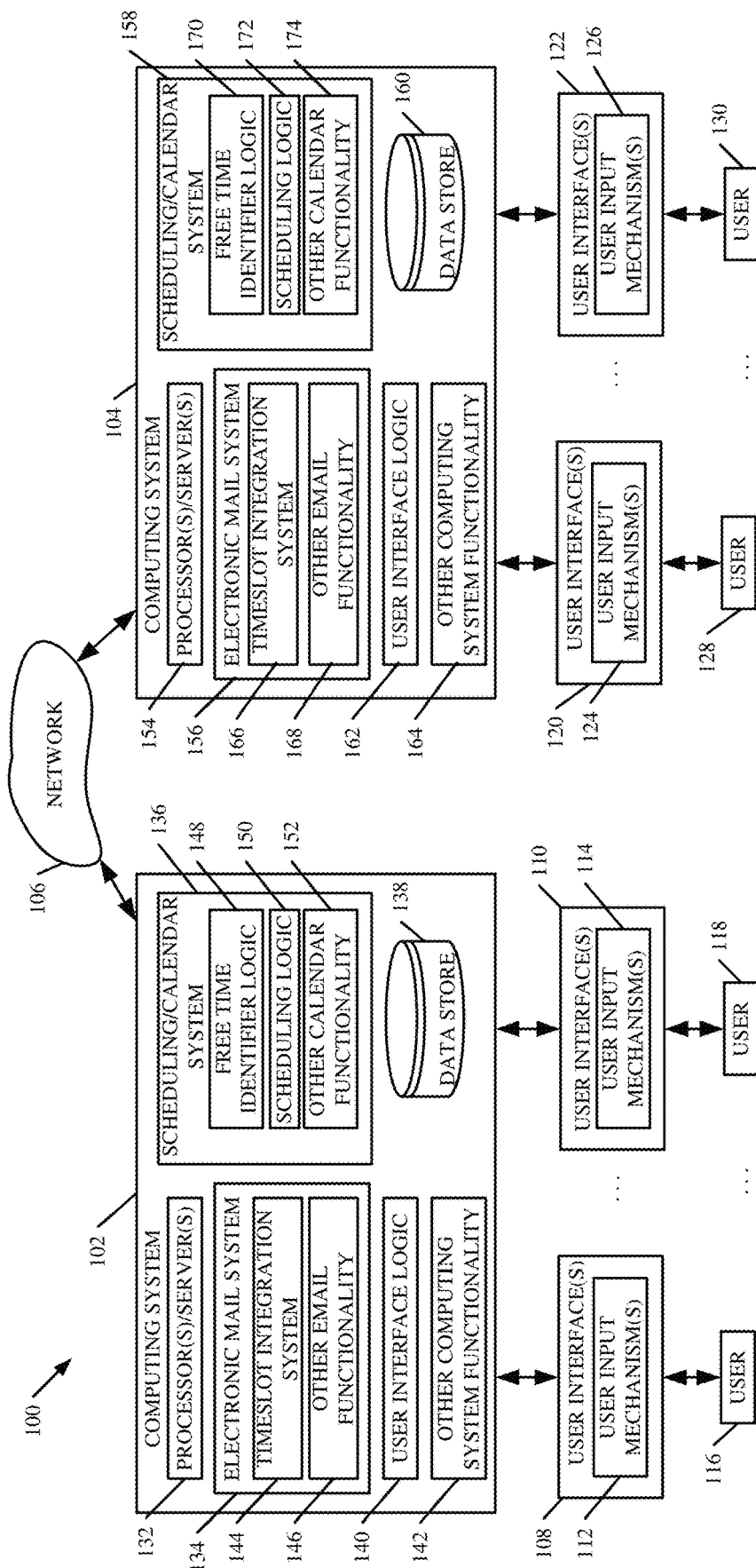
FIG. 1 is a block diagram of one example of a computing system architecture.

FIG. 1 is a block diagram of one example of a computing system architecture 100. Architecture 100 is shown with computing systems 102 and 104 in communication with one another over network 106. It will be noted that, while FIG. 1 shows only two computing systems 102 and 104 in communication with one another, there can be additional computing systems as well. The two are shown for the sake of example only.

Computing system 102 illustratively generates user interfaces 108-110 with user input mechanisms 112-114, respectively, for interaction by users 116-118. Users 116-118 illustratively interact with user input mechanisms 112-114 in order to control and manipulate computing system 102. Similarly, computing system 104 is shown generating user interfaces 120-122 with user input mechanisms 124-126 for interaction by users 128-130. Users 128-130 illustratively interact with user input mechanisms 124-126 in order to control and manipulate computing system 104

Computing system 102 illustratively includes processors or servers 132, electronic mail (email) system 134, scheduling or calendar system 136, data store 138, user interface logic 140, and it can include a wide variety of other computing system functionality 142. Electronic mail system 134, itself, includes timeslot integration system 144 and it can also include a wide variety of other electronic mail functionality 146. Calendar system 136, itself, illustratively includes free time identifier logic 148, scheduling logic 150, and a wide variety of other calendaring or scheduling functionality 152.

Computing system 104 also illustratively includes processors or servers 154, email system 156, scheduling or calendar system 158, data store 160, user interface logic 162, and it can include a wide variety of other computing system functionality 164. Email system 156, itself, illustratively includes timeslot integration system 166, and other email functionality 168. Scheduling or calendar system 158 can also include free time identifier logic 170, scheduling logic 172 and a wide variety of other scheduling or calendar functionality 174. Before describing the overall operation of architecture 100 in more detail, a brief overview of some of the items in architecture 100, and their operation, will first be provided.

User interface logic 140 in computing system 102 illustratively receives inputs from other items in computing system 102 and generates user interfaces 108-110 and also detects user inputs through mechanisms 112-114. Email system 134 illustratively allows users 116-118 to compose, send, and receive electronic mail messages. Scheduling/calendar system 136 illustratively allows users 116-118 to schedule appointments, generate meeting requests, respond to meeting requests, and perform other scheduling and calendar functions.

Timeslot integration system 144 illustratively allows a user (such as user 116) to view free timeslots in the user's calendar, on the same user interface display as one which shows electronic mail message content. This is described in more detail below. System 144 illustratively accesses free time identifier logic 148 in order to obtain free timeslots in the user's calendar and displays them for the user. The user can select one or more of the free timeslots, and timeslot integration system 144 populates those free timeslots, as selectable timeslot options, into the email message content, in-line with other content in an email thread. It then allows the user to send that email message, with the selectable timeslot options in the message content, to other users (recipients) 118, 128 and/or 130. The other users can respond to the timeslot email message, by selecting one of the selectable timeslots options displayed in the message content. The sender can then use scheduling logic 150 in calendar system 138 in order to generate a scheduling event (such as a meeting request) that is sent to the recipients who responded to the timeslot email message.

It will be noted that, in one example, computing systems 102 and 104 are similar computing systems. Therefore, email system 156 can be similar to email system 134. Also, scheduling or calendar system 158 can be similar to scheduling or calendar system 136. However, that need not be the case. Instead, the email systems can be different (or different services) as can the scheduling or calendar systems. All of these architectures are contemplated herein.

Figure 2:
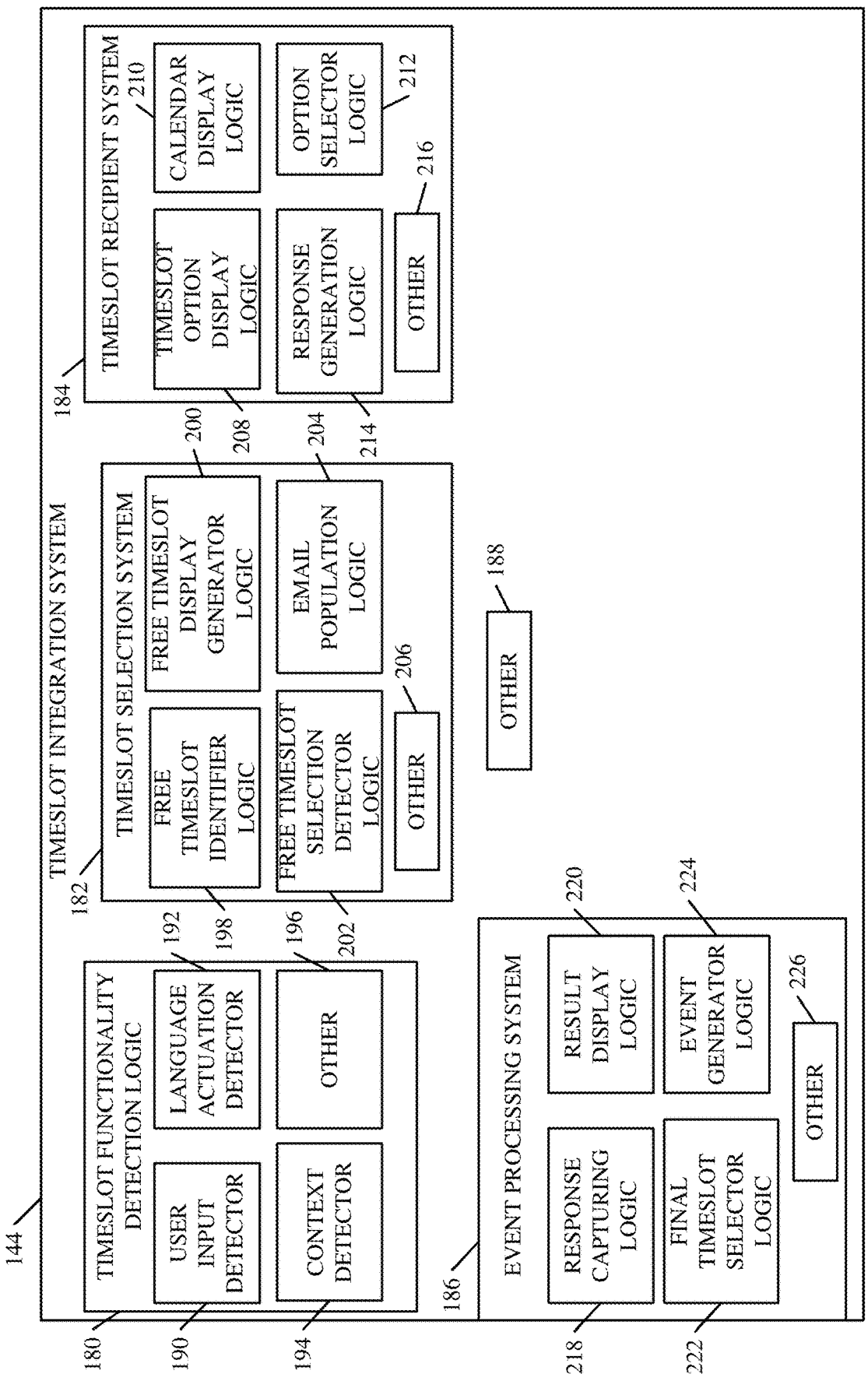
FIG. 2 is a block diagram of one example of a timeslot integration system, in more detail.

FIG. 2 is a block diagram of one example of timeslot integration system 144, in more detail. It will be noted that timeslot integration system 166 can be similar to that shown in FIG. 2 as well, or different.

Timeslot integration system 144 illustratively includes timeslot functionality detection logic 180, timeslot selection system 182, timeslot recipient system 184, event processing system 186, and it can include other items 188. Timeslot functionality detection logic 180 illustratively detects when the timeslot integration functionality of system 144 is to be invoked or activated. It includes a user input detector 190 that detects user actuation of a timeslot function actuator. It can also include language actuation detector 192 that detects when language in the content of an email message or thread indicates that the timeslot integration functionality should be triggered. Context detector 194 can trigger timeslot integration functionality based upon the context of a given computing system or the email system, or other systems. Timeslot functionality detection logic 180 can include other items 196 as well.

Timeslot selection system 182 can include free timeslot identifier logic 198, free timeslot display generator logic 200, free timeslot selection detector logic 202, email population logic 204, and it can include other items 206. In general, free timeslot identifier logic 198 accesses free timeslot identifier logic 148 in scheduling or calendar system 136 to identify free timeslots in the user's calendar. Free timeslot display generator logic 200 generates a display indicative of those free timeslots so they can be selected by the user for inclusion in an email message being composed, and free timeslot detector logic 202 detects when the user selects any of the free timeslots to be included in the email message. Email population logic 204 then populates those selected timeslots into the message content of the email message, as selectable timeslot options that can be selected by a recipient of the email message.

While timeslot selection system 182 allows a user to send an email with selectable timeslot options in it, timeslot recipient system 184 allows the user to receive such a message, sent by another user, and to interact with it. Timeslot recipient system 184 illustratively includes timeslot option display logic 208, calendar display logic 210, option selector logic 212, response generation logic 214, and it can include other items 216. In general, timeslot recipient system 184 processes email messages that are received by the user, and that include selectable timeslot options. Such an email message is referred to herein as a timeslot email message, for the sake of example. Timeslot option display logic 208 illustratively displays the timeslot options that were populated into the timeslot email message by the sender, so that one or more of them can be selected by the recipient of the timeslot email message. Calendar display logic 210 illustratively accesses the scheduling or calendar system 136 for the recipient and displays the selectable timeslot options in the received email, relative to the user's calendar, so that the user can see where those timeslot options fit in his or her calendar. Option selector logic 212 illustratively detects when the recipient has selected one of the selectable timeslot options and response generation logic 214 generates a response to the sender, indicative of the recipient's selected timeslot options.

Event processing system 186 captures and aggregates responses to a timeslot email message and displays the aggregated responses to the user (who sent the timeslot email message) so the user can select a final timeslot, based on which recipients selected which timeslot options. System 186 illustratively includes response capturing logic 218, result display logic 220, final timeslot selector logic 222, event generator logic 224, and it can include other items 226. Response capturing logic 218 illustratively detects when a response to a timeslot email message has been received and aggregates it with other responses to generate results. Result display logic 220 illustratively displays the results indicating which recipients have selected which timeslot options, and final timeslot selector logic 222 allows the sender to select a timeslot for which a calendar event will be generated. Event generator logic 224 accesses the scheduling or calendar system 136 of the sender to generate an event, such as a meeting request, based upon the sender finally selecting a timeslot option for the calendar event. Some of the operation of architecture 100 will now be described in more detail.

Figure 3:
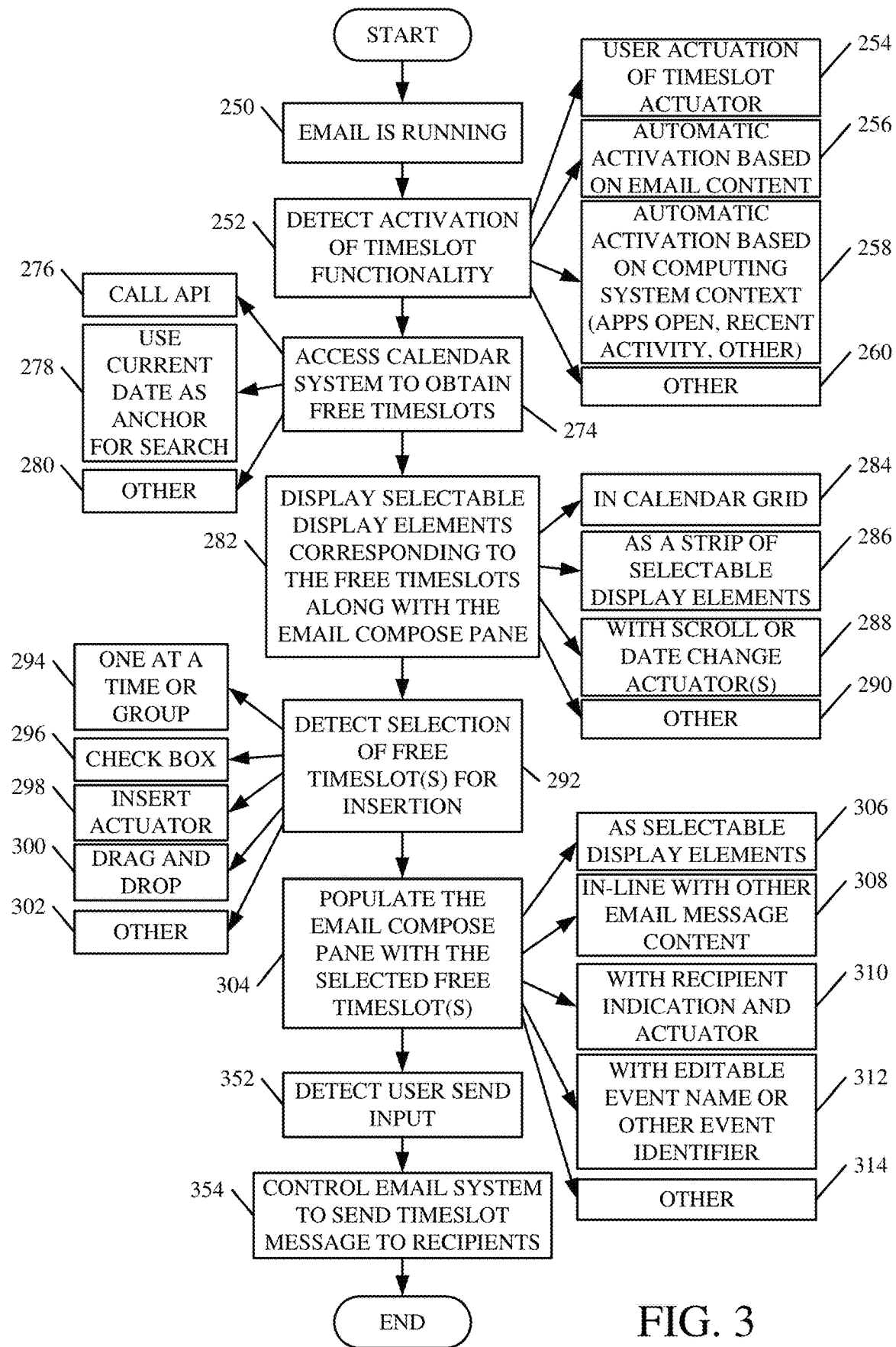
FIG. 3 is a flow diagram illustrating one example of the operation of the architecture shown in FIG. 1 in allowing a user to compose and send an email message with available timeslots.
Figure 3A:
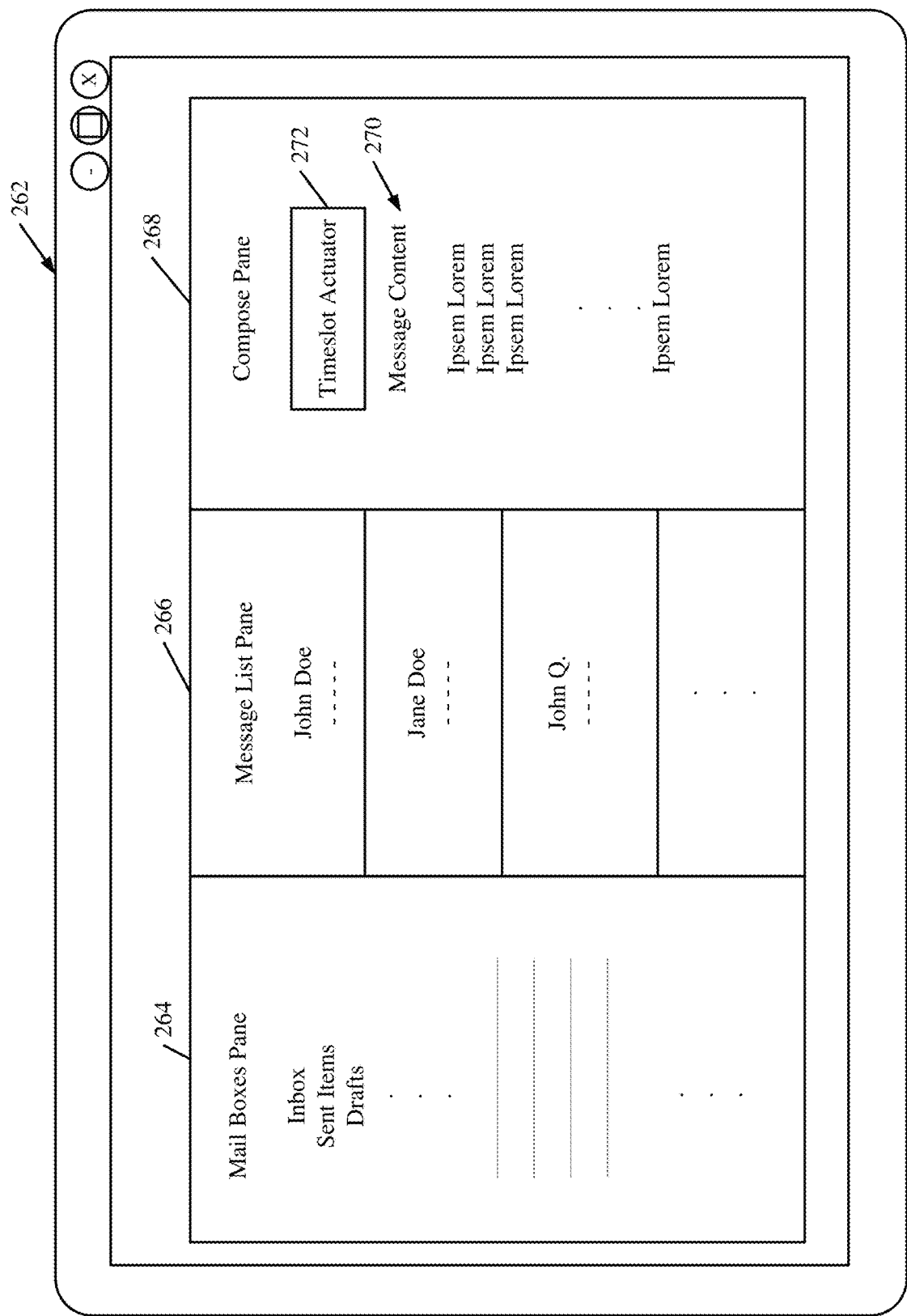
FIGS. 3A and 3B are examples of user interface displays.
Figure 3B:
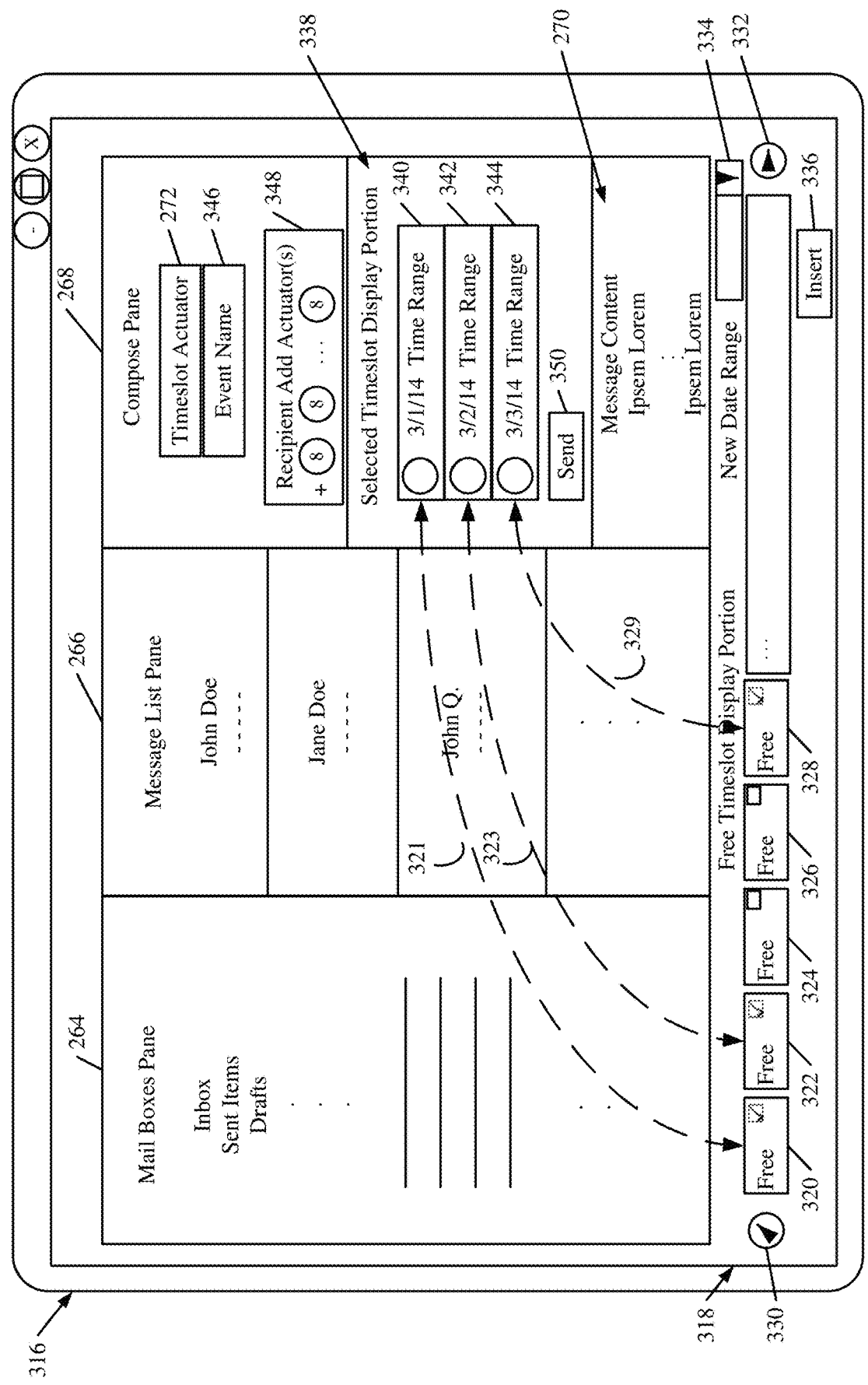

FIG. 3 is a flow diagram illustrating the operation of architecture 100 in allowing a user (such as user 116) to compose and send an email message that includes timeslot options that can be selected by a recipient (e.g., to compose and send a timeslot email message). FIGS. 3A and 3B are examples of user interface displays that can be generated. FIGS. 1-3B will now be described in conjunction with one another. It will be assumed for the sake of the present discussion that user 116 is the sender of the timeslot email message and that users 118, 128 and 130 are recipients. Of course, this is for the sake of example only.

It is first assumed that user 116 has launched or is otherwise running his or her email system 134. This is indicated by block 250 in FIG. 3.

At some point, timeslot functionality detection logic 180 will detect activation of the timeslot functionality of integration system 144. This is indicated by block 252. This can be detected in a wide variety of ways. For instance, it may be that email system 134 generates a display that allows user 116 to compose an email message and that includes a timeslot actuator that can be actuated to launch the functionality of timeslot integration system 144. User actuation of a timeslot actuator is indicated by block 254 in the flow diagram of FIG. 3.

In another example, language actuation detector 192 can detect that the functionality of system 144 should be activated based upon the linguistic content of an email message or a thread of messages. For instance, the content of the email messages may be provided to a natural language processing system or a natural language understanding system. The content of the email can be identified as content in which the users are discussing setting up a meeting, a telephone call, an appointment, etc. In that case, it may be that language actuation detector 192 automatically detects that the integration functionality of timeslot integration system 144 should be activated. Automatic activation based on email content is indicated by block 256 in FIG. 3.

Context detector 194 can also automatically detect that the integration functionality should be activated, based upon a context of computing system 102. The context may include, for instance, an identifier indicating which applications are open, the recent activity of user 116, or other items. For example, if user 116 has recently been attempting to identify free timeslots in calendar system 136, then that may indicate that the timeslot integration system 144 should be activated. Automatically activating system 144 based upon the computing system context is indicated by block 258 in the flow diagram of FIG. 3.

System 144 can be activated in other ways as well. This is indicated by block 260.

FIG. 3A shows one example of a user interface display 262 that can be generated by email system 134. It can be seen that user interface display 262 includes a mailboxes pane 264 that displays the various mailboxes in the user's email system. It includes a message list pane 266 that includes a list of messages, and it also includes a compose pane 268 in which user 116 can compose message content 270. Compose actuators (such as a keyboard) can be used to input content into an email message. User interface display 262 also illustratively includes a timeslot actuator 272. When the user actuates timeslot actuator 272, the timeslot integration functionality of system 144 is activated. In one example, actuator 272 is always displayed when the compose pane 268 is displayed by email system 134. In another example, actuator 272 is only displayed in certain contexts, or in other circumstances.

Once the functionality of timeslot integration system 144 has been activated, free timeslot identifier logic 198 then accesses free time identifier logic 148 in calendar system 136 to identify free timeslots in the calendar of user 116. Accessing the calendar system to obtain free timeslots is indicated by block 272 in the flow diagram of FIG. 3.

In one example, free timeslot identifier logic 148 in calendar system 136 exposes an application programming interface (API) that can be consumed by free timeslot identifier logic 198 in system 182. The API can be used to obtain free timeslots in the user's calendar. Calling an API to obtain the free timeslots is indicated by block 276. In one example, the current date can be used as an anchor for identifying free timeslots. For instance, the timeslots may be obtained for a week, beginning at a current date and time and extending one week into the future. They can also be obtained for a month, or for other periods of time. Using the current date as the anchor for identifying free timeslots is indicated by block 278. The free timeslots can be obtained in other ways as well, and this is indicated by block 280.

Free timeslot display generator logic 200 then displays the free timeslots that have been obtained in the user's calendar. In one example, the free timeslots are displayed along with the message content of the current email message, or the current thread. The free (or available) timeslots are represented by user selectable display elements that can be selected by user 116 for inclusion in an email message. Displaying user selectable display elements corresponding to the free timeslots along with the email content is indicated by block 282 in FIG. 3. The free timeslots can be displayed on the same user interface display that contains the compose pane 268. For instance, they can be displayed in a free timeslot display portion that is located along the bottom, or to one side, or along the top, of the user interface display. These are examples only.

In one example, the free timeslots are displayed in a calendar grid of the user's calendar. This is indicated by block 284. In another example, they are displayed as a strip of user selectable display elements, each corresponding to a free timeslot. This is indicated by block 286. They can also be displayed with scroll actuators that allow the user to scroll forward in time, and then backward in time to identify other free timeslots in the user's calendar that reside in a different time period. This is indicated by block 288. The free timeslots can be displayed in other ways as well, and this is indicated by block 290.

At some point, user 116 will select one or more of the user selectable timeslot display elements corresponding to one or more free timeslots to be included in an email message. Free timeslot selection detector logic 202 in FIG. 2 detects that selection. Detecting selection of a free timeslot for inclusion into a timeslot email message is indicated by block 292 in the flow diagram of FIG. 3. It will be noted that the user can select one free timeslot at a time, as indicated by block 294, or the user can select a group of free timeslots for inclusion in the email message, such as by using check boxes or other grouping mechanisms. This is indicated by block 296. Once the free timeslots are selected, they can be inserted in the message content in a variety of ways. For instance, a separate "insert" actuator can be provided as indicated by block 298. In another example, the user can drag and drop the selected free timeslots into the message body, as indicated by block 300. They can be selected for insertion into the email message in other ways as well, and this is indicated by block 302.

Email population logic 204 (in FIG. 2) then populates the email message with the selected free timeslots. This is indicated by block 304 in the flow diagram of FIG. 3. In one example, the free timeslots are inserted into the compose pane of the email message as selectable timeslot option display elements. This is indicated by block 306. Thus, when a recipient receives the timeslot email message, the user can select one of the free timeslot options by actuating the corresponding selectable display element. The selectable display element can be inserted in-line with other electronic mail message content as indicated by block 308. They can include a recipient indicator, with an add actuator that allows user 116 to add or delete recipients of the timeslot email message. This is indicated by block 310. The email can include an editable event name field that the user can use to name an event for which a meeting request may be generated. This is indicated by block 312. The free timeslots can be populated into the electronic mail message in other ways as well, and this is indicated by block 314.

FIG. 3B is a diagram of another example of a user interface display 316 that can be generated by email system 134 and timeslot integration system 144. Some of the items are similar to those shown in FIG. 3A, and they are similarly numbered. Thus, it can be seen that user interface display 316 includes a mailboxes pane 264, a message list pane 266 and message content 270 that is displayed in compose pane 268. However, FIG. 3B also shows that free timeslot display generator logic 200 has now also generated free timeslot display portion 318. Portion 318 illustratively includes a set of user selectable display elements 320, 322, 324, 326, and 328. Each of the display elements 320-328 is selectable by user 116, and corresponds to a free timeslot (or an available timeslot) in the user's calendar. Portion 318 also illustratively includes scroll actuators 330 and 332 that can be actuated to move forward and backward in time to identify other free timeslots that the user may have in his or her calendar. Similarly, a new date range actuator 334 can be used to identify a different date range for which free timeslots are to be identified.

FIG. 3B shows that the user has selected the free timeslots corresponding to user selectable display elements 320, 322 and 328. Email population logic 204 (shown in FIG. 2) can then populate compose pane 268 with display elements corresponding to the selected free timeslots. For instance, the user can then illustratively actuate an "insert" actuator 336 to have the free timeslots populated into the compose pane 268, in-line with message content 270. This is indicated by dashed arrows 321, 323 and 329. In another example, the user can drag and drop display elements 320, 322 and 328 from free timeslot display portion 318 onto compose pane 268 where they will be inserted in-line with message content 270. These are only two ways of selecting free timeslots for insertion into the message body in compose pane 268, and others can be used as well.

FIG. 3B shows that selected timeslot display portion 338 includes a plurality of user actuatable display elements 340, 342 and 344, each of which correspond to a different free timeslot option that was selected by the user from free timeslot display portion 318. These display elements can then be selected by a recipient of the timeslot email message to indicate which timeslot the recipient prefers. FIG. 3B also shows that, in the example illustrated, the compose pane 268 is now populated with an event name field 346 and a recipient actuator 348. Event name field 346 can illustratively be edited by user 116 to name the meeting for which the free timeslots are being proposed. Recipient actuators 348 illustratively allow the user to add or delete recipients from the timeslot email message that the user is about to send. In addition, selected timeslot display portion 338 can include a send actuator 350 (or it can be included elsewhere on user interface display 316). When the user actuates the send actuator 350, the message content 270 is sent, along with the selected timeslot display portion 338, to the recipients identified in the recipient actuator section 348.

Returning again to the flow diagram of FIG. 3, email system 134 then detects that the user has actuated the send actuator 350, and it sends the timeslot email message to the various recipients identified in section 348. Detecting the user send input and sending the email is indicated by blocks 352 and 354 in the flow diagram of FIG. 3.

Figure 4:
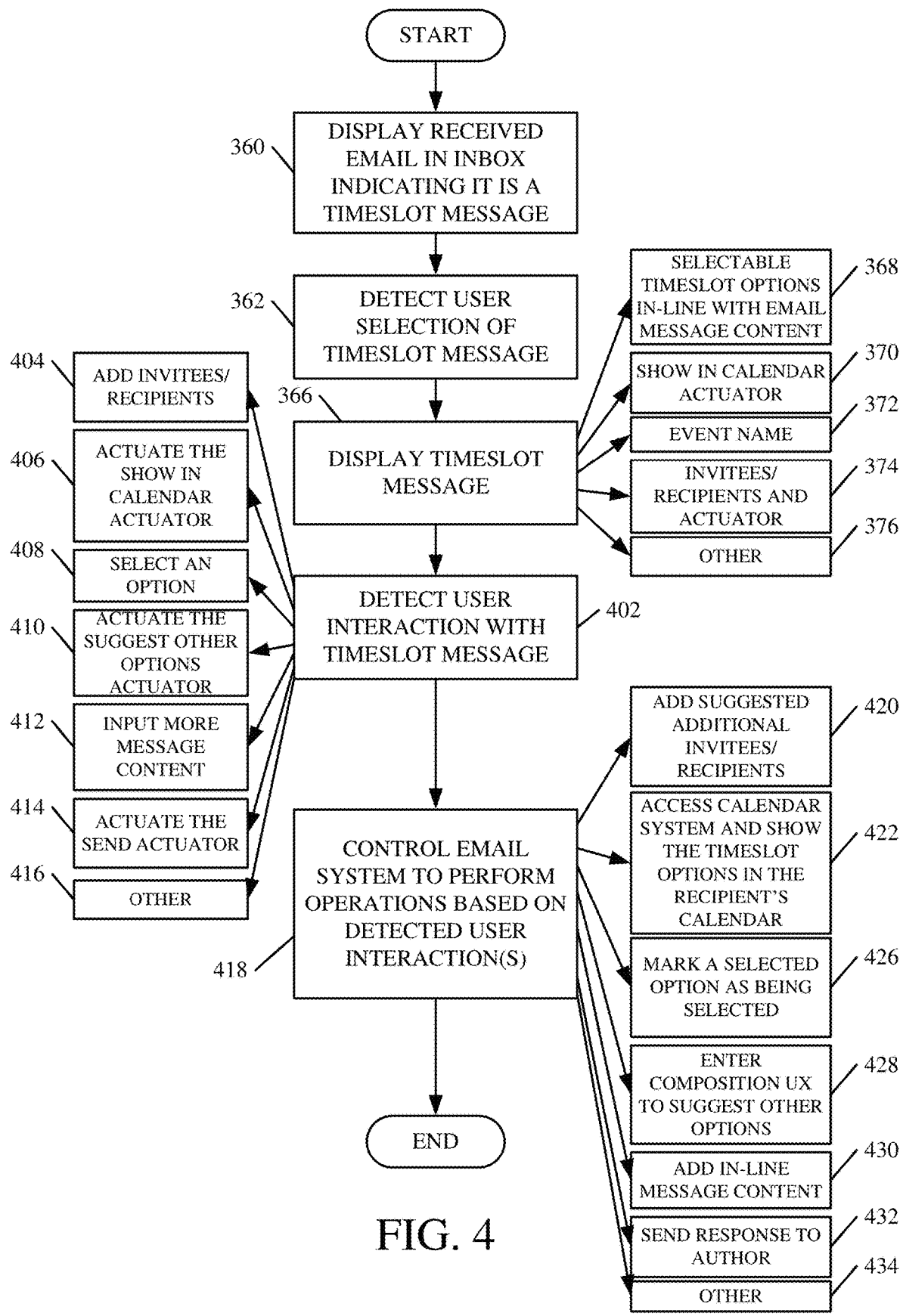
FIG. 4 is a flow diagram illustrating one example of the operation of the architecture shown in FIG. 1 in allowing a recipient to select one of the available timeslots.
Figure 4A:
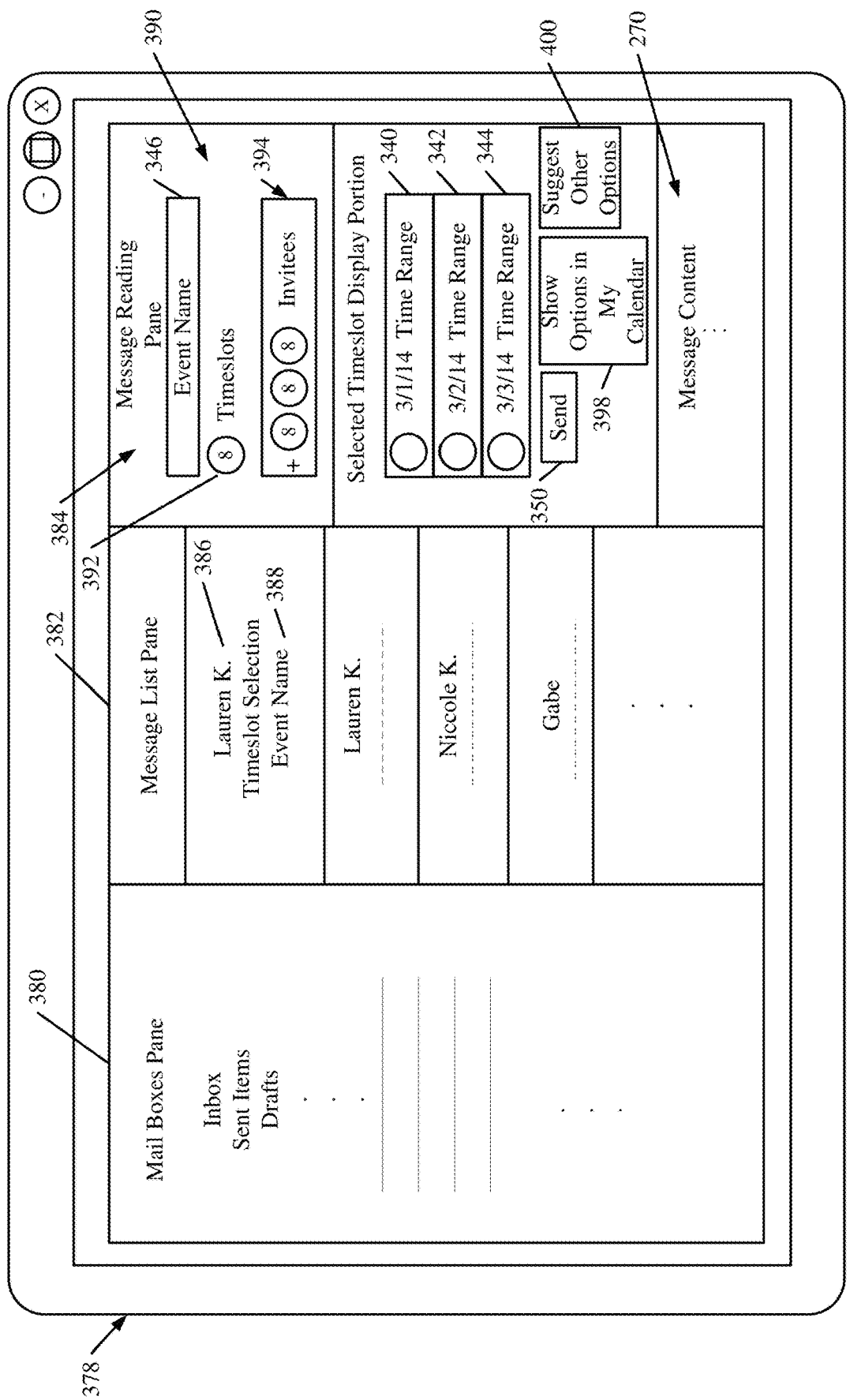
FIGS. 4A and 4B are examples of user interface displays.

FIG. 4 is a flow diagram illustrating one example of the operation of timeslot recipient system 184, when a timeslot email message (an email message with selectable free timeslot options) is received by a recipient. Again, with respect to the present example, the recipients are users 118, 128 and 130. The present discussion will proceed with respect to the processing performed when user 128 is the recipient, but this is by way of example only. FIG. 4A is one example of a user interface display that can be generated at a recipient system. FIGS. 1, 2, 4 and 4A will now be described in conjunction with one another.

Timeslot option display logic 208 in timeslot recipient system 184 (shown in FIG. 2) detects that an email indicating that it has a timeslot email message (one that has selectable, available timeslot options for display to the recipient) is first displayed in the inbox of user 128. This is indicated by block 360 in FIG. 4. At some point, the email system will detect that the user 128 has selected the timeslot email message for display in the message reading pane. This is indicated by block 362. Timeslot option display logic 208 then displays the timeslot message in the reading pane of the email system of user 128. This is indicated by block 366.

The displayed timeslot email message can have a number of displayed items. For instance, it can include the selectable timeslot options displayed in-line with the email message content, as discussed above with respect to the message composed by sender 116. Displaying selectable timeslot options in-line with the message content is indicated by block 368 in the flow diagram of FIG. 4. The recipient can also actuate a user input mechanism in order to show the timeslot options in the recipient's calendar. Displaying the actuator to show the timeslot options in the user's calendar is indicated by block 370. The event name can be displayed as indicated by block 372, and the invitees or recipients, along with an actuator to modify the list of potential recipients, is indicated by block 374. The timeslot email message can be displayed in other ways as well, and this is indicated by block 376.

FIG. 4A shows one example of a user interface display 378 that can be generated once the user has selected a timeslot message from a message list pane 382 for display in a reading pane 384. It can be seen that user interface display 378 shows a mailbox pane 380, a message list pane 382 and the message reading pane 384. Message list pane 382 shows that a message has a display item 386 that indicates that a message has been received and that it is a timeslot email message that has available timeslots that will be displayed for selection by the recipient. It can also illustratively include the event name 388.

The message reading pane 384 shows that the message content 270 can be displayed in-line with the timeslot information indicated generally by 390. The timeslot information 390 can include the event name 346, an indication of the sender indicated at 392, a list of invitees along with an actuator shown generally at 394, a selectable or actuatable display element corresponding to each of the timeslot options contained in the timeslot email message and indicated by 340, 342 and 344, a send actuator 396, a "show options in my calendar" actuator 398 and a "suggest other options" actuator 400.

Timeslot recipient system 184 can detect various recipient interactions with the message displayed in FIG. 4A and take a variety of different actions. Detecting recipient interaction with the timeslot message is indicated by block 402 in the flow diagram of FIG. 4. For instance, the recipient can actuate the invitee/recipient actuator 394 to modify the list of potential invitees. This is indicated by block 404. The recipient can actuate the "show options in my calendar" actuator 398. This is indicated by block 406. The user can select a timeslot option by actuating one of the timeslot option display elements 340-344. This is indicated by block 408. The recipient can actuate the "suggest other options" actuator 400. This is indicated by block 410. The recipient can input more message content 270. This is indicated by block 412. The recipient can also actuate the "send" actuator 396. This is indicated by block 414. The recipient can interact with the timeslot message in other ways as well, and this is indicated by block 416. Once the system has detected recipient interaction with the timeslot message, it illustratively controls the email system to perform operations based on those detected interactions. This is indicated by block 418 in the flow diagram of FIG. 4.

Figure 4B:
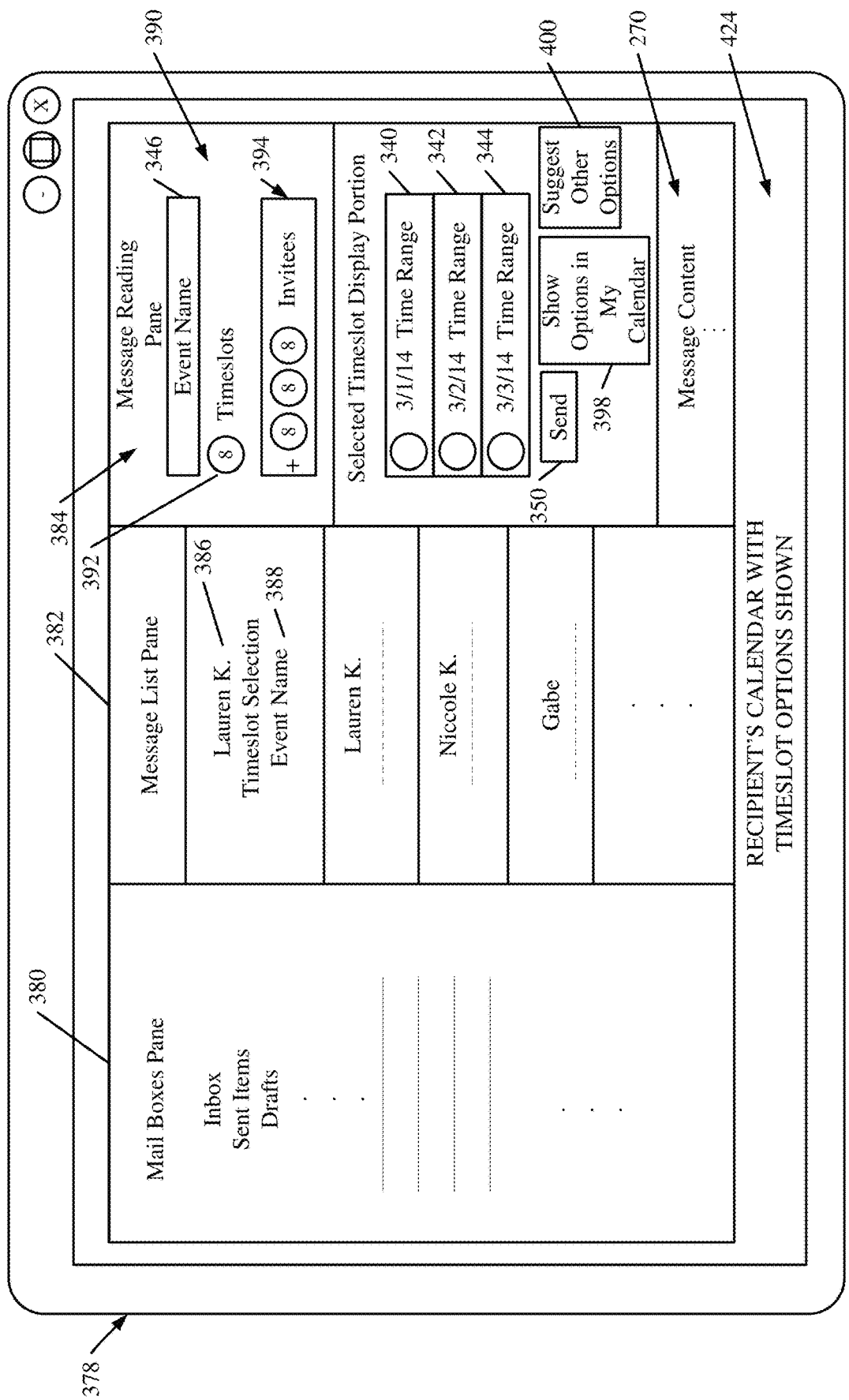

By way of example, if the recipient actuates the invitee actuator 394, timeslot recipient system 184 can modify the list of invitees (such as add or delete suggested additional invitees or recipients). This is indicated by block 420. If the recipient actuates the "show options in my calendar" actuator 398, then the calendar display logic 210 in system 184 (shown in FIG. 2) accesses the recipient's calendar system 158 and shows the timeslot options in the recipient's calendar. A display is generated, for example, with the timeslot options overlaid on the recipient's calendar to identify where they would fit in. This is indicated by block 422. FIG. 4B shows one example of this.

It can be seen that display 378 shown in FIG. 4B is similar to that shown in FIG. 4A, and similar items are similarly numbered. However, it can be seen that display 378 now includes a calendar display section 424 that displays the recipient's calendar, along with the various timeslot options 340, 342 and 344 displayed within the recipient's calendar, and highlighted or otherwise visually distinguished from the remaining calendar information, so that the recipient can easily see where the timeslot options fit in his or her calendar.

The recipient can also actuate one of the actuatable display elements corresponding to the timeslot options 340-344. This is indicated by block 426 in FIG. 4. In that case, option selector logic 212 detects that the recipient has selected one of the options.

If the recipient actuates the "suggest other options" actuator 400, then timeslot functionality detection logic 180 detects that, and controls the computing system to enter a composition user experience, similar to that described above with respect to FIGS. 3-3B, where the recipient 128 can now propose different timeslot options back to the original sender 116. This is indicated by block 428.

If the recipient 128 actuates the message content portion 270, and begins to add message content, that content can be added, in-line with the other content in the timeslot email message. This is indicated by block 430.

If the recipient actuates the "send" actuator 398, then response generation logic 214 generates a responsive message, reflecting the user interaction with the timeslot email message shown in FIG. 4B, and controls the email system to send it to the original sender 116. Sending the response to the author or original sender 116 is indicated by block 432 in the flow diagram of FIG. 4.

The recipient can of course interact with the timeslot email message in other ways as well. Other actions can then be taken. This is indicated by block 434.

Figure 5:
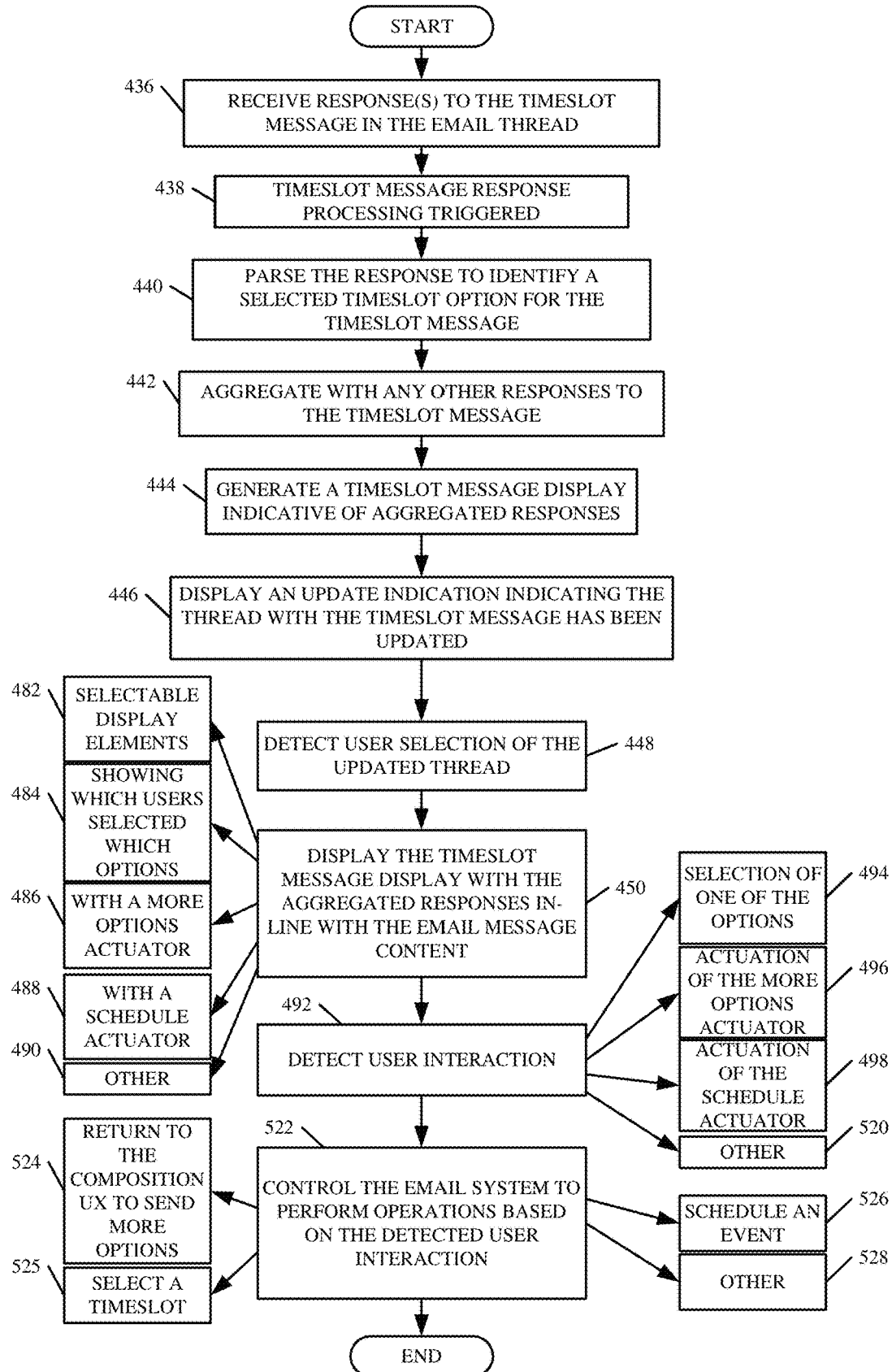
FIG. 5 is a flow diagram illustrating one example of the operation of the architecture shown in FIG. 1 in allowing a user to process responses received by recipients.

FIG. 5 is a flow diagram illustrating the operation of timeslot integration system 144, once user 116 has received one or more responses to the timeslot email message that was sent to recipients 118, 128 and 130. Email system 134 first receives one or more responses to the timeslot email message, in the email thread in which it was composed. This is indicated by block 436 in the flow diagram of FIG. 5. The timeslot email message response processing performed by event processing system 186 is then triggered. This is indicated by block 438. It may be, for instance, that a timeslot email message has a particular identifier associated with it. When the email system that sent the message receives a response, it knows, from the identifier, that this is a response to a timeslot email message and triggers the response processing. This can be done in other ways as well.

Response capturing logic 218 then parses the response to identify which, if any, of the timeslot options has been selected by the recipient in the timeslot email message response. This is indicated by block 440. Logic 218 then aggregates the selected timeslot option with any other responses to the timeslot email message, as indicated by block 442. For instance, a record may be opened for a timeslot email message once it is sent. As responses are received, that record may be updated to indicate which recipients have responded, and which timeslot options they have selected, if any. It may also indicate that one or more recipients have suggested other timeslot options or it may indicate other information as well.

Result display logic 220 then generates a timeslot message response (or result) display indicative of the aggregated responses. This is indicated by block 444. For instance, the display may provide a visual indication identifying which recipients have selected which timeslot options, etc. Once the result display is generated, result display logic 220 then displays an update indication indicating that the thread with the timeslot email message has been updated and that the result display has been generated. For instance, in the message list pane of the email system for user 116, it may provide an entry indicating that responses have been received to the timeslot email message, and also identifying the aggregated results (as is shown in more detail below). It can display an update indication indicating that the thread has been updated in other ways as well, and this is indicated by block 446.

Figure 5A:
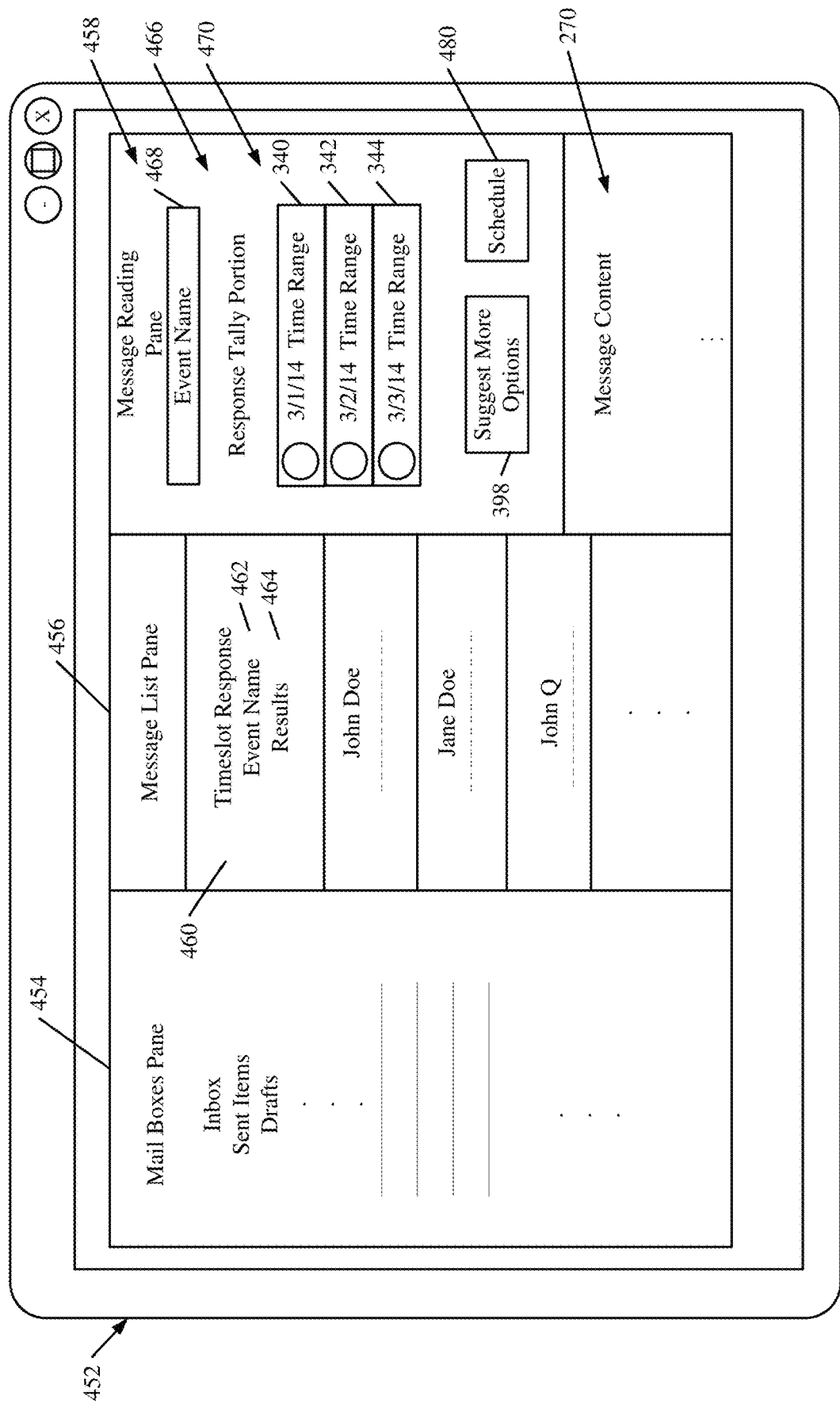
FIG. 5A is one example of a user interface display.

At some point, the user will select the updated thread, from the message list pane, for display in the reading pane of the user's email system. This is indicated by block 448. Result display logic 220 then displays the timeslot message result display with the aggregated responses, in-line with the email message content. This is indicated by block 450. FIG. 5A shows one example of this.

FIG. 5A is a user interface display 452 that is similar to some of the other user interface displays. Therefore, it includes a mailboxes pane 454, a message list pane 456, and a message reading pane 458. It can be seen that the message list pane 456 includes an entry 460 showing that the mail thread that contained the timeslot message has been updated. In one example, the indication 460 identifies the event name 462 and it may show the results 464 of aggregation of the various responses. FIG. 5A also shows that the user has selected the item 460 from message list pane 456 so that it is now displayed in the message reading pane 458.

It can be seen that the reading pane 458 displays an aggregated timeslot message results portion 466 that shows the results of the responses received, thus far, to the timeslot message. This is displayed in-line with message content 270. Portion 466 illustratively includes the event name 468, and then a response tally portion 470 that tallies the various responses and indicates which recipients (or responders) have selected which of the various timeslot options. Each of the timeslot options is again associated with a user actuatable display element 472, 474 and 476. Each element 472-476 identifies the particular responders that have chosen the corresponding timeslot option. The display can also include an actuator 478 that can be actuated to suggest more timeslot options, and a schedule actuator 480 that generates a scheduling event from one of the selected timeslot options. Displaying the timeslot options as selectable display elements is indicated by block 482 in the flow diagram of FIG. 5. Showing which of the recipients selected which of the timeslot options is indicated by block 484. Displaying the actuator 478 that can be actuated to suggest more timeslot options is indicated by block 486, and displaying the schedule actuator 480 that can be actuated to generate a scheduling or calendar event is indicated by block 488. Displaying the timeslot message results display with aggregated responses can be displayed in other ways as well, and this is indicated by block 490.

Event processing system 186 then detects user interaction with display 452. This is indicated by block 492 in the flow diagram of FIG. 5. User 116 can interact with the display 452 in a variety of different ways. For instance, user 116 can actuate one or more of the user actuable display elements 472-476 corresponding to the timeslot options in the message results portion 466. This is indicated by block 494. If one of the display elements 472-476 has been selected by user 116, the user 116 can also actuate the schedule actuator 480. This is indicated by block 498. User 116 can actuate actuator 478 to suggest more options as indicated by block 496. The user can interact with the message in other ways as well, and this is indicated by block 520.

Event processing system 186 then controls the email system 134 to perform operations based on the detected user interaction. This is indicated by block 522. For instance, if the user has actuated actuator 478 to suggest more timeslot options, then the system returns the user to the composition user experience where more timeslot options can be suggested, as described above with respect to FIG. 3. This is indicated by block 524. When the user actuates one of the actuators 472-476, then final timeslot selector logic 222 identifies this as a selected, final timeslot for which an event will be generated. This is indicated by block 525 in FIG. 5. When the user actuates the schedule actuator 480, then event generator logic 224 can generate a calendar or scheduling event. This is indicated by block 526 and is described in more detail below. The user can interact with the message in other ways as well. This is indicated by block 528.

Figure 6:
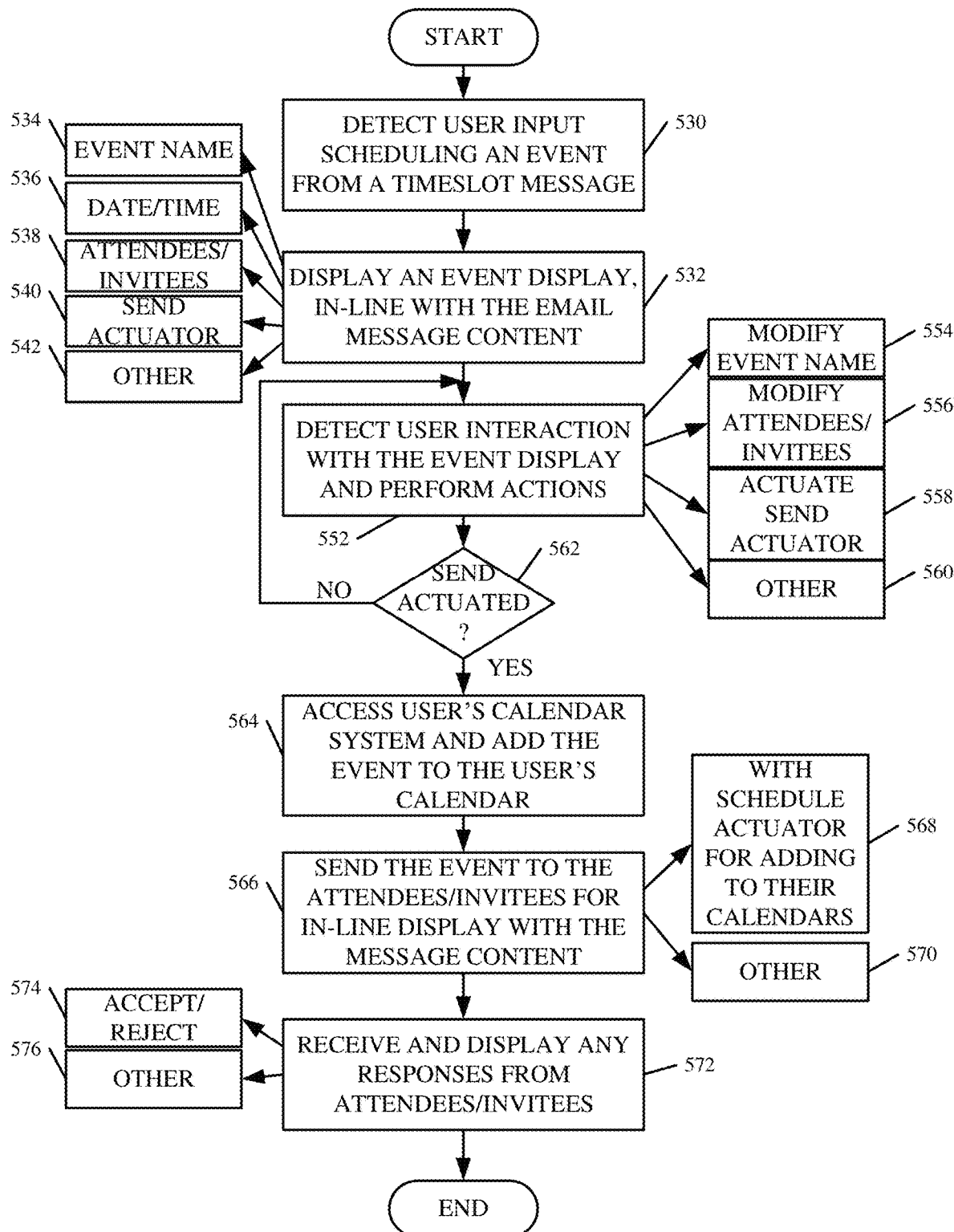
FIG. 6 is a flow diagram illustrating the operation of the architecture shown in FIG. 1 in scheduling an event.

FIG. 6 is a flow diagram illustrating one example of the operation of event generator logic 224 in architecture 100, in generating an event once the user 116 has finally selected one of the suggested timeslot options (such as by selecting one of the display elements 472-476 in FIG. 5A). At some point, the user will provide a scheduling input indicating that an event is to be generated from the timeslot email message. This can be done by actuating the schedule actuator 480. Detecting a user scheduling input from a timeslot email message is indicated by block 530 in the flow diagram of FIG. 6.

Figure 6A:
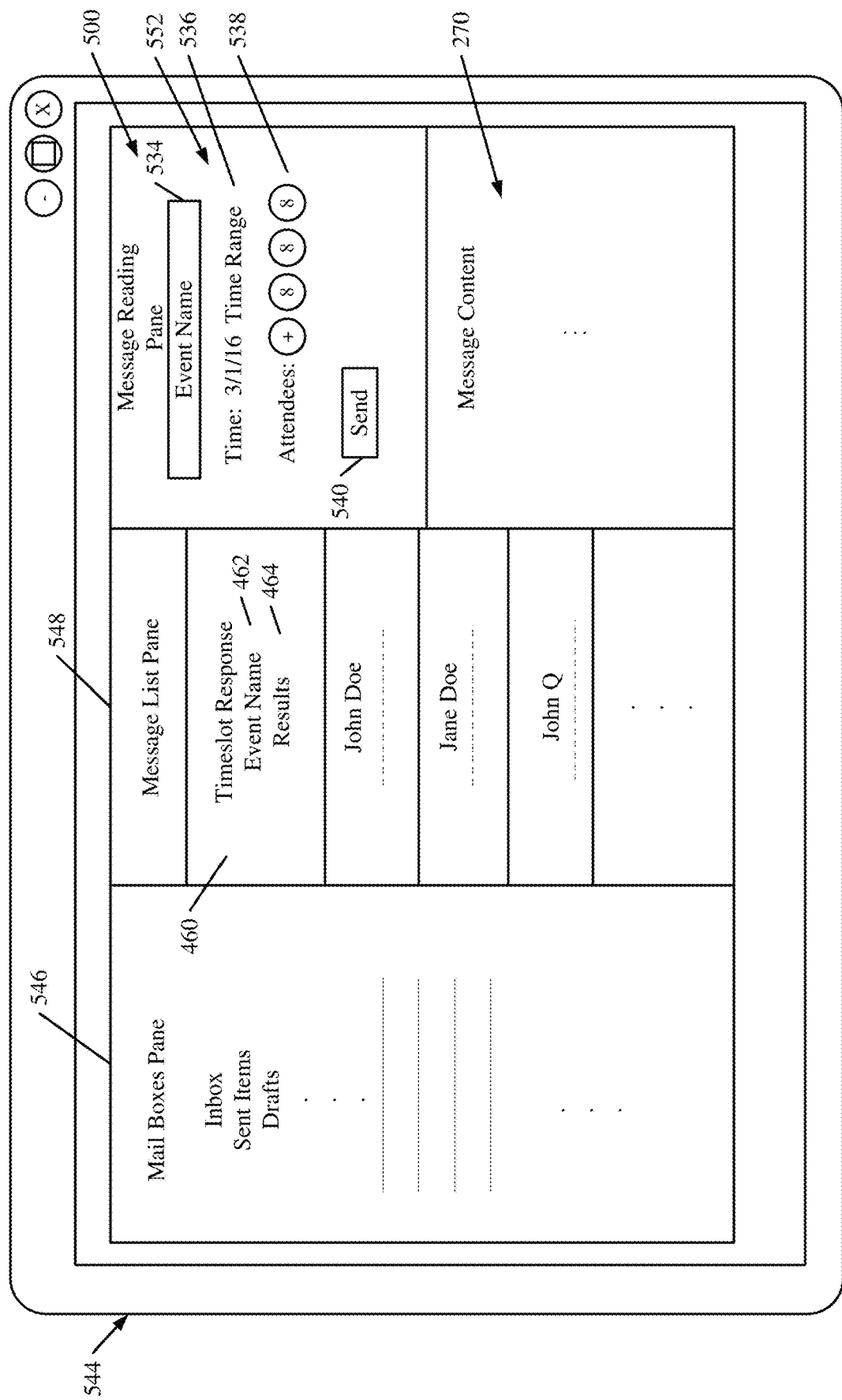
FIG. 6A is one example of a user interface display.

Logic 224 then displays an event display, in-line with the email message content 270. This is indicated by block 532. The event display may include the event name as indicated by block 534. It may include the date and time of the event as indicated by block 536. It may include a list of attendees or invitees as indicated by block 538. It may also include a "send" actuator 540 that can be actuated to send the event to the calendaring systems of the invitees or attendees, and it can include other items 542, as well. FIG. 6A is an example of a user interface display 544 that shows some of these items.

It can be seen that, again, display 544 includes a mailboxes pane 546, a message list pane 548, and a reading pane 550. Reading pane 550 includes the message content 270 and it now includes an event display 552. Event display 552 includes the event name 534, a date and time 536 for the event, a list of attendees or invitees 538, and the "send" actuator 540.

User 116 may again interact with the event display 552 to perform certain actions. Detecting user interaction with the event display 552 and performing actions is indicated by block 553 in the flow diagram of FIG. 6. For instance, user 116 may modify the event name 534. This is indicated by block 554 in the flow diagram of FIG. 6. User 116 may modify the attendees or invitees 538. This is indicated by block 556. The user may actuate the "send" actuator 540, as indicated by block 558. The user may interact with the event display in other ways as well, such as by adding message content 270, etc. This is indicated by block 560.

At some point, the user 116 actuates send actuator 540. This is indicated by block 562. When this occurs, event generator logic 224 illustratively accesses the scheduling logic 150 in the user's scheduling or calendar system 136 and adds the event to the user's calendar. This is indicated by block 564. Again, this may be done by calling an API that is exposed by the scheduling or calendar system 136 to add an event to the calendar. In addition, logic 224 controls the email system to send the event to the attendees or invitees for in-line display with message content 270, in the email systems of those invitees or attendees. This is indicated by block 566. The message may include a schedule actuator that can be actuated by the recipients in order to add the event to their calendar or schedule. This is indicated by block 568. It can include other items 570 as well.

When a recipient has added the event to his or her calendar, the timeslot integration system for the recipient can control the email system to generate a response indicative of this. Thus, event generator logic 224 for user 116 illustratively receives and displays any such responses from attendees or invitees. This is indicated by block 572. This can include an indication as to whether those attendees or invitees have accepted or rejected the event. This is indicated by block 574. It can include other items as well. This is indicated by block 576.

It can thus be seen that the present system allows a user to propose times for a scheduling event or calendar event to email recipients, within the context of the email user interface display, and without navigating away from the email user interface display. The available times can be viewed on the email display and selected by the sender, at which point they are populated into the message content, in-line with other message content, in an email message. This can be done by individually selecting timeslots, by selecting them as a group, by using a drag and drop input, by using touch gestures, or by using a wide variety of other mechanisms. Recipients also receive the available timeslots in their email system and can see where those available timeslots fit within their own calendars, all within the context of the email display, and without navigating away from the content of the email message thread on which the message was received. Thus, the users need not leave the context of their conversation when either proposing timeslot options or when responding to those options. In addition, once a final timeslot has been selected by the sender, a calendar or scheduling event can be automatically generated and sent to the recipients for inclusion in their calendars.

Because the calendar and email systems are displayed on a single user interface display, the user need not switch back and forth between the calendar or scheduling system and the email system. This saves computer processing overhead, because the computing system need not individually render separate user interface displays for each of those systems. Instead, the free timeslots are automatically identified and displayed on the email user interface display of both the sender and the recipient so that the users need not switch back and forth between the two displays, and so that the computing system need not individually render those displays. Not only does this save computer processing overhead and network bandwidth in obtaining and rendering information, but it also saves the user time and is much less cumbersome than prior systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
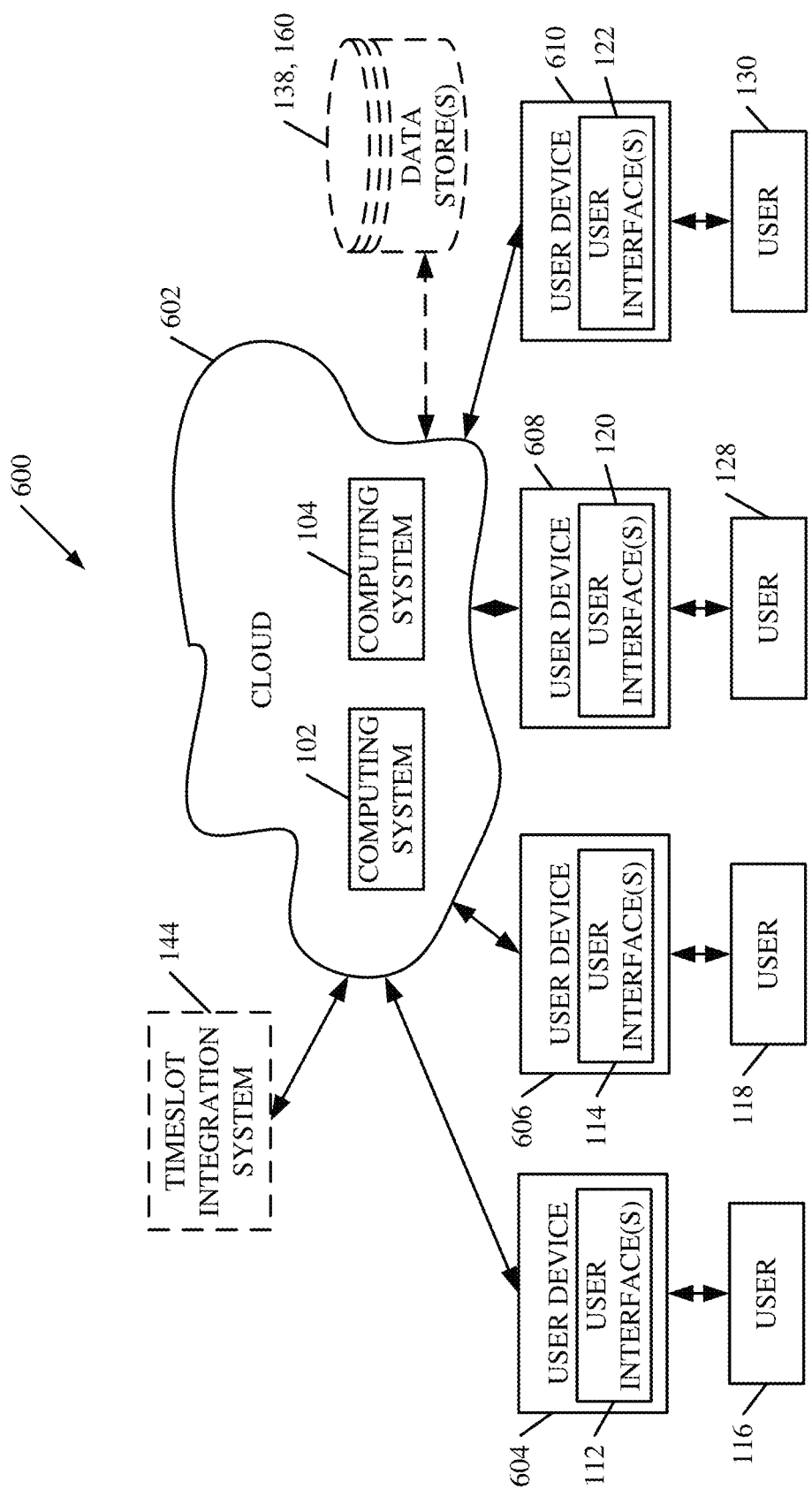
FIG. 7 is a block diagram showing the architecture illustrated in FIG. 1, deployed in a cloud computing architecture.

FIG. 7 is a block diagram of architecture 100, shown in FIG. 1, except that its elements are disposed in a cloud computing architecture 600. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that computing systems 102 and 104 can be located in cloud 602 (which can be public, private, or a combination where portions are public while others are private). Therefore, users 116, 118, 128 and 130 can use user devices 604, 606, 608 and 610 to access those systems through cloud 602.

FIG. 7 also depicts another example of a cloud architecture. FIG. 7 shows that it is also contemplated that some elements of computing systems 102 and 104 can be disposed in cloud 602 while others are not. By way of example, data stores 138 and 160 can be disposed outside of cloud 602, and accessed through cloud 602. In another example, timeslot integration system 144 can be outside of cloud 602. Regardless of where they are located, they can be accessed directly by devices 604-610, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
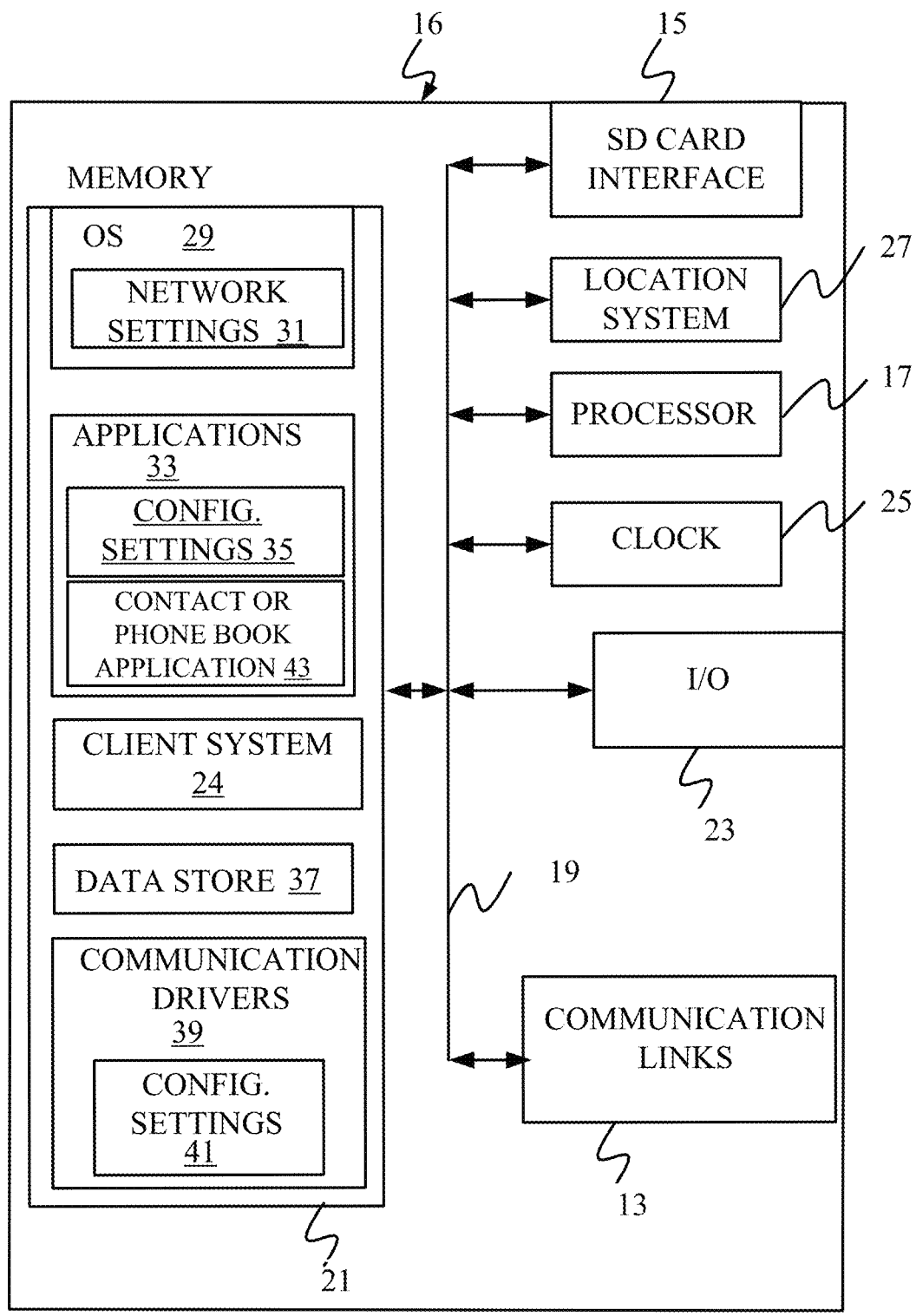
FIGS. 8-10 are examples of mobile devices that can be used in the architectures shown in the previous figures.
Figure 9:
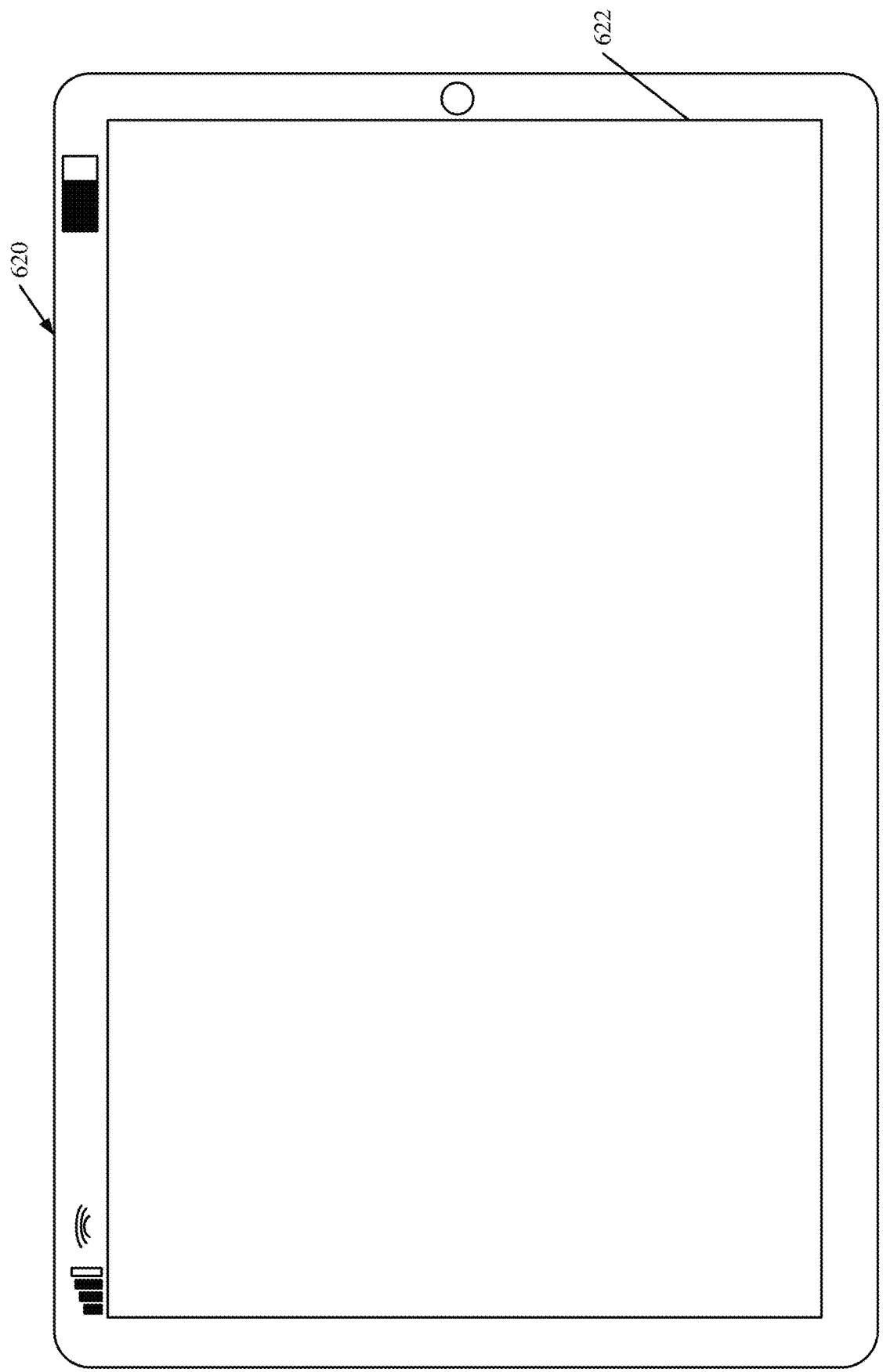
Figure 10:
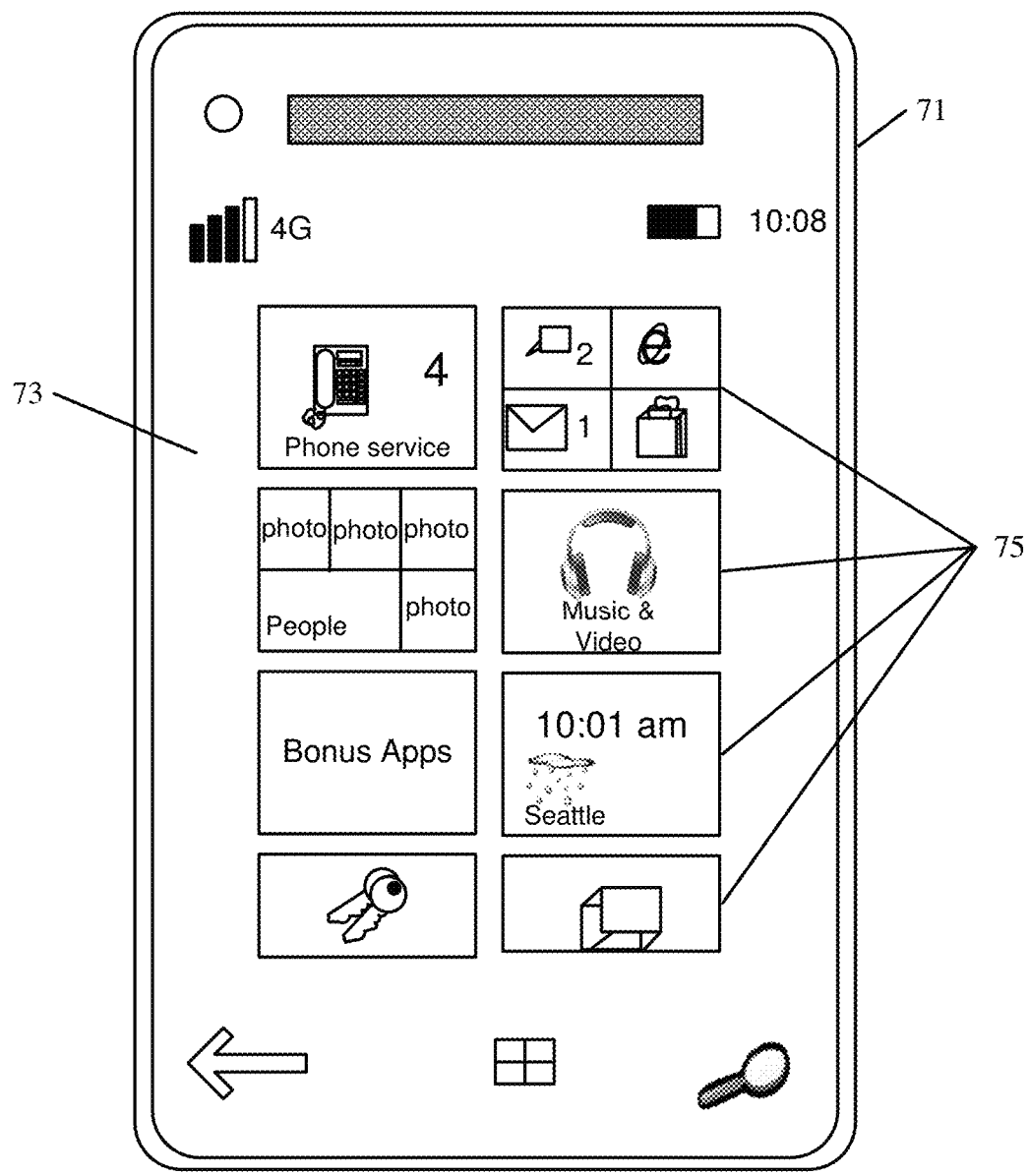

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100, or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of the systems in architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 620. In FIG. 6, computer 620 is shown with user interface display screen 622. Screen 622 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
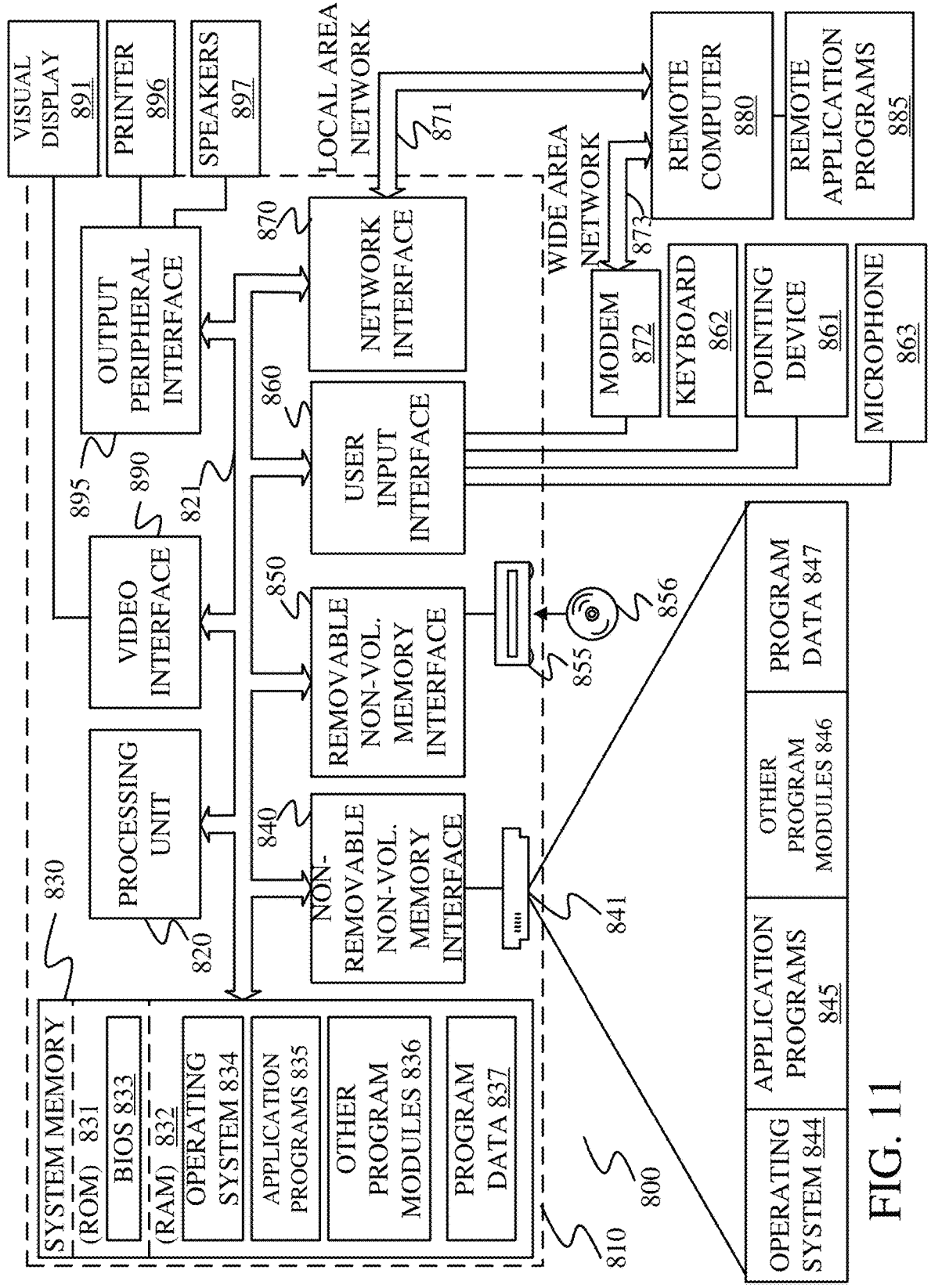
FIG. 11 is a block diagram of one example of a computing environment that can be used in the architectures shown in the previous figures.

FIG. 11 is one example of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an electronic mail (email) system that displays an email user interface display with a compose pane having a compose actuator that is actuated to compose an email message with message content;

free timeslot display generator logic that displays a free timeslot display portion with a user selectable available timeslot display element, corresponding to a free timeslot in a schedule of a user, on the email user interface display;

free timeslot selection detector logic that detects user selection of the available timeslot display element in the timeslot display portion of the email user interface display; and email population control logic that controls the email system to populate the compose pane with a recipient-actuatable timeslot option display element corresponding to the free timeslot, in line with the message content on the compose pane, to generate a timeslot email message, the recipient-actuatable timeslot option display element being selectable by a recipient of the timeslot email message.

Example 2 is the computing system of any or all previous examples and further comprising:

a calendar system that exposes an interface that is called to obtain an indication of the free timeslot in the schedule of the user.

Example 3 is the computing system of any or all previous examples and further comprising:

free timeslot identifier logic that calls the interface exposed by the calendar system to obtain the indication of the free timeslot and provide it to the free timeslot display generator logic.

Example 4 is the computing system of any or all previous examples and further comprising:

timeslot functionality detection logic that detects a timeslot condition and, in response, activates the free timeslot identifier logic.

Example 5 is the computing system of any or all previous examples wherein the timeslot functionality detection logic comprises:

a user input detector that detects user actuation of a displayed timeslot actuator on the email user interface display.

Example 6 is the computing system of any or all previous examples wherein the timeslot functionality detection logic comprises:

a language actuation detector that activates the free timeslot identifier logic based on a linguistic interpretation of the message content of the email message.

Example 7 is the computing system of any or all previous examples wherein the timeslot functionality detection logic comprises:

a context detector that detects a context of the computing system and that activates the free timeslot identifier logic based on a context of the computing system.

Example 8 is the computing system of any or all previous examples and further comprising:

response capturing logic that identifies a response to the timeslot email message, identifies a selected one of the recipient-actuatable timeslot option display elements in the timeslot email message and aggregates the selected one of the recipient-actuatable timeslot option display elements with any other selected recipient-actuatable timeslot option display elements in any other responses to the timeslot email message; and result display logic that generates a result display in the email system showing results of the timeslot email message indicative of the aggregated, selected timeslot option display elements, in line with the message content of the timeslot email message.

Example 9 is the computing system of any or all previous examples wherein the results of the timeslot email message comprise a selectable display element corresponding to each of the selected timeslot option display elements in the responses to the timeslot email message, and further comprising:

final timeslot selector logic that detects user selection of a final timeslot by detecting selection of a selectable display element corresponding to one of the selected timeslot option display elements on the result display; and event generator logic that accesses the calendar system and generates a scheduling event for the final timeslot and sends the scheduling event to recipients of the timeslot email message.

Example 10 is the computing system of any or all previous examples and further comprising:

timeslot message recipient system that identifies receipt of a timeslot message from another user;

timeslot option display logic that displays recipient-actuatable timeslot option display elements corresponding to free timeslots in a schedule of the other user, in line with message content of the timeslot message from the other user; and calendar display logic that accesses the calendar system and displays the free timeslots in the schedule of the other user in the calendar of the user.

Example 11 is the computing system of any or all previous examples wherein the timeslot message recipient system comprises:

option selector logic that detects user selection of one of the recipient-actuatable timeslot option display elements in the timeslot message from the other user; and response generator logic that generates a response to the timeslot message received from the other user, the response being indicative of the one recipient-actuatable timeslot option display element.

Example 12 is a computer implemented method, comprising:

displaying an email user interface display with a compose pane having a compose actuator that is actuated to compose an email message with message content;

displaying a free timeslot display portion with a user selectable available timeslot display element, corresponding to a free timeslot in a schedule of a user, on the email user interface display;

detecting user selection of the available timeslot display element in the timeslot display portion of the email user interface display; and controlling the email system to populate the compose pane with a recipient-actuatable timeslot option display element corresponding to the free timeslot, in line with the message content on the compose pane, to generate a timeslot email message, the recipient-actuatable timeslot option display element being selectable by a recipient of the timeslot email message.

Example 13 is the computer implemented method of any or all previous examples and further comprising:

invoking an interface exposed by a calendar system to obtain an indication of the free timeslot for display.

Example 14 is the computer implemented method of any or all previous examples and further comprising:

detecting a response to the timeslot email message;

identifying, in the response, a selected one of the recipient-actuatable timeslot option display elements in the timeslot email message;

aggregating the selected one of the recipient-actuatable timeslot option display elements with any other selected recipient-actuatable timeslot option display elements in any other responses to the timeslot email message; and generating a result display in the email system showing results of the timeslot email message indicative of the aggregated, selected timeslot option display elements, in line with the message content of the timeslot email message.

Example 15 is the computer implemented method of any or all previous examples wherein the results of the timeslot email message comprise a selectable display element corresponding to each of the selected timeslot option display elements in the responses to the timeslot email message, and further comprising:

detecting user selection of a final timeslot by detecting selection of a selectable display element corresponding to one of the selected timeslot option display elements on the result display;

generating a scheduling event for the final timeslot; and sending the scheduling event to recipients of the timeslot email message.

Example 16 is the computer implemented method of any or all previous examples and further comprising:

identifying receipt of a timeslot message from another user;

displaying recipient-actuatable timeslot option display elements corresponding to free timeslots in a schedule of the other user, in line with message content of the timeslot message from the other user; and displaying the free timeslots in the schedule of the other user in the calendar of the user.

Example 17 is the computer implemented method of any or all previous examples and further comprising:

detecting user selection of one of the recipient-actuatable timeslot option display elements in the timeslot message from the other user; and generating a response to the timeslot message received from the other user, the response being indicative of the one recipient-actuatable timeslot option display element.

Example 18 is a computing system, comprising:

an electronic mail (email) system that displays an email user interface display with a compose pane having a compose actuator that is actuated to compose an email message with message content;

a calendar system that exposes an interface that is called to obtain an indication of a free timeslot in a schedule of a user;

free timeslot identifier logic that calls the interface exposed by the calendar system to obtain the indication of the free timeslot;

free timeslot display generator logic that obtains the indication of the free timeslot and displays a free timeslot display portion with a user selectable available timeslot display element, corresponding to a free timeslot in the schedule of the user, on the email user interface display;

free timeslot selection detector logic that detects user selection of the available timeslot display element in the timeslot display portion of the email user interface display; and email population control logic that controls the email system to populate the compose pane with a recipient-actuatable timeslot option display element corresponding to the free timeslot, in line with the message content on the compose pane, to generate a timeslot email message, the recipient-actuatable timeslot option display element being selectable by a recipient of the timeslot email message.

Example 19 is the computing system of any or all previous examples and further comprising:

response capturing logic that identifies a response to the timeslot email message, identifies a selected one of the recipient-actuatable timeslot option display elements in the timeslot email message and aggregates the selected one of the recipient-actuatable timeslot option display elements with any other selected recipient-actuatable timeslot option display elements in any other responses to the timeslot email message, the results of the timeslot email message comprising a selectable display element corresponding to each of the selected timeslot option display elements in the responses to the timeslot email message;

result display logic that generates a result display in the email system showing results of the timeslot email message indicative of the aggregated, selected timeslot option display elements, in line with the message content of the timeslot email message;

final timeslot selector logic that detects user selection of a final timeslot by detecting selection of a selectable display element corresponding to one of the selected timeslot option display elements on the result display; and event generator logic that accesses the calendar system and generates a scheduling event for the final timeslot and sends the scheduling event to recipients of the timeslot email message.

Example 20 is the computing system of any or all previous examples and further comprising:

timeslot message recipient system that identifies receipt of a timeslot message from another user;

timeslot option display logic that displays recipient-actuatable timeslot option display elements corresponding to free timeslots in a schedule of the other user, in line with message content of the timeslot message from the other user;

calendar display logic that accesses the calendar system and displays the free timeslots in the schedule of the other user in the calendar of the user;

option selector logic that detects user selection of one of the recipient-actuatable timeslot option display elements in the timeslot message from the other user; and response generator logic that generates a response to the timeslot message received from the other user, the response being indicative of the one recipient-actuatable timeslot option display element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system, the method comprising:
   causing display of a single window that includes:
   a compose pane having a compose actuator; and
   a free timeslot display portion configured to display, along with the compose pane in the single window, a plurality of user-selectable timeslot display elements, each user-selectable timeslot display element, of the plurality of user-selectable timeslot display elements, identifying a different free timeslot in a schedule associated with a user;
   generating message content in an electronic message based on an indication of user actuation of the compose actuator while the free timeslot display portion is displayed in the single window;
   receiving an indication of user selection of one or more user-selectable timeslot display elements in the free timeslot display portion; and
   in response to the user selection, populating the compose pane in the single window with a plurality of timeslot option display elements in line with the message content in the compose pane,
   wherein each timeslot option display element, of the plurality of timeslot option display elements, corresponds to a respective free timeslot in the schedule associated with the user and is actuatable by a recipient of the electronic message.

2. The method of claim 1, wherein receiving an indication of user selection of the one or more user-selectable timeslot display elements comprises detecting a drag and drop user input that drags the one or more user-selectable timeslot display elements from the free timeslot display portion to the compose pane.

3. The method of claim 1, and further comprising:
receiving a response to the electronic message;
detecting, based on the response, that the recipient of the electronic message selected a selected timeslot option display element, of the plurality of timeslot option display elements, in the electronic message;
aggregating the selected timeslot option display element with another selected timeslot option display element in another response to the electronic message; and
generating a result display that includes results of the electronic message indicative of the aggregated, selected timeslot option display elements, in line with the message content of the electronic message.

4. The method of claim 3, wherein the results of the electronic message comprise a selectable display element corresponding to each of the selected timeslot option display elements in the responses to the electronic message, and further comprising:
detecting user selection of a final timeslot by detecting selection of a selectable display element corresponding to one of the selected timeslot option display elements on the result display;
generating a scheduling event for the final timeslot; and
sending the scheduling event to recipients of the electronic message.

5. The method of claim 4, and further comprising:
identifying receipt of a second electronic message from another user;
displaying recipient-actuatable timeslot option display elements corresponding to free timeslots in a schedule of the other user, in line with message content of the second electronic message from the other user; and
displaying the free timeslots in the schedule of the other user in the calendar associated with the user.

6. The method of claim 5, and further comprising:
detecting user selection of one of the recipient-actuatable timeslot option display elements in the second electronic message from the other user; and
generating a response to the second electronic message received from the other user, the response being indicative of the one recipient-actuatable timeslot option display element.

7. A computing system comprising:
at least one processor; and
memory storing instructions executable by the at least one processor, wherein the instructions, when executed, cause the computing system to:
cause display of a single window that includes:
a compose pane having a compose actuator; and
a free timeslot display portion configured to display, along with the compose pane in the single window, a plurality of user-selectable timeslot display elements, each user-selectable timeslot display element, of the plurality of user-selectable timeslot display elements, identifying a different free timeslot in a schedule associated with a user;
generate message content in an electronic message based on an indication of user actuation of the compose actuator while the free timeslot display portion is displayed in the single window;
receive an indication of user selection of one or more user-selectable timeslot display elements in the free timeslot display portion; and
in response to the user selection, populate the compose pane in the single window with a plurality of timeslot option display elements in line with the message content in the compose pane,
wherein each timeslot option display element, of the plurality of timeslot option display elements, corresponds to a respective free timeslot in the schedule associated with the user and is actuatable by a recipient of the electronic message.

8. The computing system of claim 7, wherein the indication of user selection of the one or more user-selectable timeslot display elements comprises a drag and drop user input that drags the one or more user-selectable timeslot display elements from the free timeslot display portion to the compose pane.

9. The computing system of claim 7, wherein the instructions cause the computing system to:
receive a response to the electronic message;
detect, based on the response, that the recipient of the electronic message selected a selected timeslot option display element, of the plurality of timeslot option display elements, in the electronic message;
aggregate the selected timeslot option display element with another selected timeslot option display element in another response to the electronic message; and
generate a result display that includes results of the electronic message indicative of the aggregated, selected timeslot option display elements, in line with the message content of the electronic message.

10. The computing system of claim 9, wherein the results of the electronic message comprise a selectable display element corresponding to each of the selected timeslot option display elements in the responses to the electronic message, and wherein the instructions cause the computing system to:
detect user selection of a final timeslot by detecting selection of a selectable display element corresponding to one of the selected timeslot option display elements on the result display;
generate a scheduling event for the final timeslot; and
send the scheduling event to recipients of the electronic message.

11. The computing system of claim 10, wherein the instructions cause the computing system to:
identify receipt of a second electronic message from another user;
display recipient-actuatable timeslot option display elements corresponding to free timeslots in a schedule of the other user, in line with message content of the second electronic message from the other user; and
display the free timeslots in the schedule of the other user in the calendar associated with the user.

12. The computing system of claim 11, wherein the instructions cause the computing system to:
detect user selection of one of the recipient-actuatable timeslot option display elements in the second electronic message from the other user; and
generate a response to the second electronic message received from the other user, the response being indicative of the one recipient-actuatable timeslot option display element.

13. A computing system comprising:
at least one processor; and
memory storing instructions executable by the at least one processor, wherein the instructions, when executed, cause the computing system to:
cause display of a single window that includes:
a compose pane having a compose actuator; and
a free timeslot display portion configured to display a plurality of user-selectable timeslot display elements, each user-selectable timeslot display element, of the plurality of user-selectable timeslot display elements, identifying a different free timeslot in a schedule associated with a user;

generate message content in an electronic message based on an indication of user actuation of the compose actuator;

detect a drag and drop user input that drags one or more user-selectable timeslot display elements from the free timeslot display portion to the compose pane in the single window; and in response to the user selection, populate the compose pane in the single window with a plurality of timeslot option display elements in line with the message content in the compose pane, wherein each timeslot option display element, of the plurality of timeslot option display elements, corresponds a respective free timeslot in the schedule associated with the user and is actuatable by a recipient of the electronic message.

14. The computing system of claim 13, wherein the instructions cause the computing system to:

receive a response to the electronic message;

detect, based on the response, that the recipient of the electronic message selected one of the timeslot option display elements in the electronic message;

aggregate the selected one of the timeslot option display elements with any other selected recipient-actuatable timeslot option display elements in any other responses to the electronic message; and generate a result display that includes results of the electronic message indicative of the aggregated, selected timeslot option display elements, in line with the message content of the electronic message.

15. The computing system of claim 14, wherein the results of the electronic message comprise a selectable display element corresponding to each of the selected timeslot option display elements in the responses to the electronic message, and wherein the instructions cause the computing system to:

detect user selection of a final timeslot by detecting selection of a selectable display element corresponding to one of the selected timeslot option display elements on the result display;

generate a scheduling event for the final timeslot; and send the scheduling event to recipients of the electronic message.

* * * * *